(12) United States Patent
Guan et al.

(10) Patent No.: US 9,940,897 B2
(45) Date of Patent: Apr. 10, 2018

(54) SYSTEMS AND METHODS FOR A SHARED MIXED REALITY EXPERIENCE

(71) Applicants: AWE COMPANY LIMITED, Toronto (CA); Ryerson University, Toronto (CA)

(72) Inventors: Ling Guan, North York (CA); Matthew Kyan, Toronto (CA); Srinivas Krishna, Toronto (CA); Jason Raymond Thomas Bond, Toronto (CA); Nan Dong, Richmond Hill (CA); Naimul Mefraz Khan, Toronto (CA); Xiaoming Nan, Toronto (CA); Yifeng He, North York (CA); Edward Biggs, Toronto (CA)

(73) Assignees: AWE COMPANY LIMITED (CA); REYERSON UNIVERSITY (CA)

( * ) Notice: Subject to any disclaimer, the term of this patent is extended or adjusted under 35 U.S.C. 154(b) by 0 days.

(21) Appl. No.: 14/893,630

(22) PCT Filed: May 23, 2014

(86) PCT No.: PCT/IB2014/061672
§ 371 (c)(1),
(2) Date: Nov. 24, 2015

(87) PCT Pub. No.: WO2014/188393
PCT Pub. Date: Nov. 27, 2014

(65) Prior Publication Data
US 2016/0104452 A1 Apr. 14, 2016

Related U.S. Application Data

(60) Provisional application No. 61/827,462, filed on May 24, 2013.

(51) Int. Cl.
*G06T 19/00* (2011.01)
*G06F 3/0481* (2013.01)
(Continued)

(52) U.S. Cl.
CPC .......... *G09G 5/006* (2013.01); *A63F 13/213* (2014.09); *A63F 13/35* (2014.09); *A63F 13/65* (2014.09);
(Continued)

(58) Field of Classification Search
CPC ..................................................... G06T 19/006
See application file for complete search history.

(56) References Cited

U.S. PATENT DOCUMENTS

2002/0084974 A1* 7/2002 Ohshima ................. A63F 13/00
345/156
2002/0196202 A1* 12/2002 Bastian ................ G02B 27/017
345/8
(Continued)

FOREIGN PATENT DOCUMENTS

WO 2011109126 9/2011
WO WO-2012/106075 A1 * 8/2012
WO WO 2012148678 A1 * 11/2012 ........... G01C 21/165

OTHER PUBLICATIONS

Naimul Mefraz Khan, Xiaoming Nan, Nan Dong, Yifeng He, Matthew Kyan, Jennifer James, Ling Guan, and Charles Davis, Towards a Shared Large-Area Mixed Reality System, 2016, IEEE, in Multimedia & Expo Workshops (ICMEW), 2016 IEEE International Conference on, pp. 1-6.*
(Continued)

*Primary Examiner* — Jeffery A Brier
(74) *Attorney, Agent, or Firm* — Tarolli, Sundheim, Covell & Tummino LLP

(57) ABSTRACT

A method for sharing a mixed reality experience (mixed reality content, mixed reality event) between one or more
(Continued)

computing devices is disclosed. The method includes: determining a spatial location and a spatial orientation (spatial data) of the one or more computing devices each having a camera; mapping the (spatial) location and/or the spatial orientation (spatial data) of each of the one or more computing devices into a mixed reality manager; and presenting an event that is shared among the one or more computing devices, and, the presenting of the event is experienced simultaneously and varies among each of the one or more computing devices depending on the location or the orientation or both.

24 Claims, 13 Drawing Sheets

(51) Int. Cl.
  *G09G 5/00* (2006.01)
  *G06T 15/20* (2011.01)
  *A63F 13/65* (2014.01)
  *A63F 13/847* (2014.01)
  *A63F 13/213* (2014.01)
  *A63F 13/35* (2014.01)
  *G06F 3/01* (2006.01)
  *G06F 3/03* (2006.01)
  *G06F 3/0346* (2013.01)
  *G06F 3/14* (2006.01)
  *G06K 9/46* (2006.01)
  *G06K 9/62* (2006.01)
  *G01S 5/02* (2010.01)

(52) U.S. Cl.
  CPC .......... *A63F 13/847* (2014.09); *G01S 5/0284* (2013.01); *G06F 3/011* (2013.01); *G06F 3/0304* (2013.01); *G06F 3/0346* (2013.01); *G06F 3/04815* (2013.01); *G06F 3/1423* (2013.01); *G06K 9/4661* (2013.01); *G06K 9/6201* (2013.01); *G06T 15/20* (2013.01); *G06T 19/006* (2013.01); *A63F 2300/6661* (2013.01); *G06T 2200/04* (2013.01)

(56) References Cited

U.S. PATENT DOCUMENTS

| | | | |
|---|---|---|---|
| 2003/0156144 A1* | 8/2003 | Morita | G06T 19/006 715/848 |
| 2004/0109009 A1* | 6/2004 | Yonezawa | G06T 19/006 345/632 |
| 2005/0168486 A1* | 8/2005 | Sato | A63F 13/10 345/633 |
| 2006/0227998 A1* | 10/2006 | Hobgood | G06T 7/70 382/103 |
| 2012/0162254 A1* | 6/2012 | Anderson | H04N 5/2621 345/633 |
| 2012/0242798 A1 | 9/2012 | Mcardle et al. | |
| 2012/0249591 A1 | 10/2012 | Maciocci et al. | |
| 2012/0263154 A1 | 10/2012 | Blanchflower et al. | |
| 2012/0320033 A1 | 12/2012 | Papaefstathiou et al. | |
| 2013/0050260 A1* | 2/2013 | Reitan | G06F 3/011 345/633 |
| 2013/0083018 A1* | 4/2013 | Geisner | G06F 3/011 345/420 |
| 2013/0083173 A1 | 4/2013 | Geisner et al. | |
| 2013/0132434 A1* | 5/2013 | Scofield | G08G 1/0112 707/771 |
| 2013/0222369 A1* | 8/2013 | Huston | G06T 17/00 345/419 |
| 2013/0326364 A1* | 12/2013 | Latta | G06F 3/012 715/751 |
| 2014/0287806 A1* | 9/2014 | Balachandreswaran | A63F 13/00 463/7 |
| 2014/0315570 A1* | 10/2014 | Yun | H04W 4/043 455/456.1 |
| 2014/0354685 A1* | 12/2014 | Lazarow | G02B 27/0172 345/633 |

OTHER PUBLICATIONS

PCT/IB2014/061672 International Search Report and Written Opinion, dated Aug. 20, 2014.
EP 14 80 0556 Supplementary Partial European Search Report—dated Jan. 5, 2017.

* cited by examiner

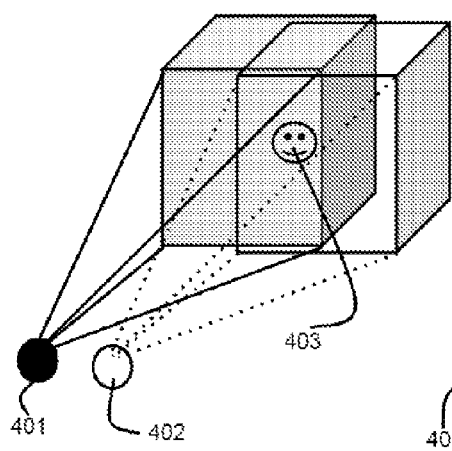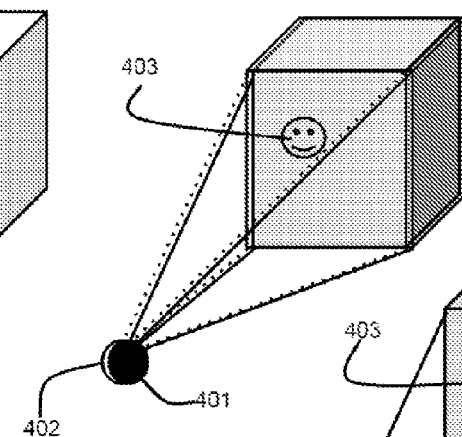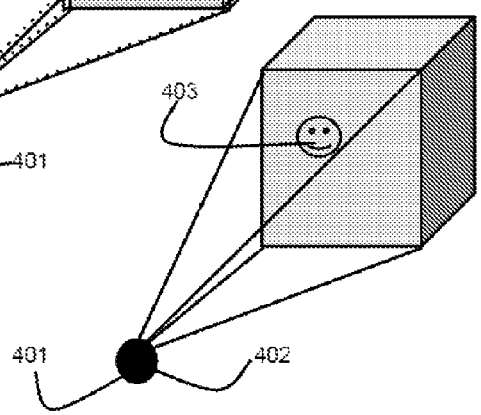

SYSTEMS AND METHODS FOR A SHARED MIXED REALITY EXPERIENCE

CROSS REFERENCES TO RELATED APPLICATIONS

This application filed under 35 U.S.C § 371 is a national phase application of International Application Serial Number PCT/IB2014/061672 filed May 23, 2014, which claims priority to U.S. Provisional Application 61/827,462, filed May 24, 2013.

TECHNICAL FIELD

The technical field generally relates to systems and methods associated with a mixed reality experience.

BACKGROUND

Mediated reality refers to the ability to modify a user's perception of the real world using computers. This can include filtering out elements of the real world or by augmenting reality with virtual elements. Mixed reality (also called a mixed reality experience, a mixed reality content, a mixed reality event and/or an augmented reality) refers to modifying a user's perception of the world using a blend of real and virtual (i.e., computer-generated) elements.

A mediated reality system can apply computer generated elements such as audio-visual data or geo-location data to a live camera feed to augment a user's perception of reality. Other mediated reality systems can be used to computationally filter extraneous data, such as High Dynamic Range (HDR) vision goggles.

Mixed reality is a subset of mediated reality where computer generated virtual elements are blended with real world views so that the virtual elements appear to exist in the real world. Generally, this can be performed through a portable mixed reality device such as a tablet, smartphone, or a wearable device such as the GOOGLE Glass (TRADEMARK) device. These mixed reality devices are generally used to augment a user's perception of reality, such as by overlaying information on an image of a real world location.

In some systems, one or more mediated reality devices can be used to experience a mediated reality in a group setting. An example of a group mediated reality system is described in *Human Pacman* (Hwee, Goh Kok: 2004. *Human Pacman*. Master Thesis, National University of singapore). Generally, games, such as Human Pacman, rely on each device to provide reality mediation; that is, each user experiences his or her own version of the mediated reality. In the case of Human Pacman, each "dot" is rendered by each mediated reality device based on data provided by a central gaming server.

SUMMARY

What is provided are methods, systems, and computer program products for one or more users to experience a synchronized, interactive, and shared mixed reality event where each user has their own perspective of the mixed reality event depending on the user's positional (spatial) location and camera view (point of view). The event may be, for example, a cinematic sequence, a motion picture, an animation, or a special effect.

Although every user will experience the same mixed reality sequence at the same time, each user's experience of the mixed reality sequence will depend on the user's location (the point of view of the device or computer being used by the user). For example, a user standing directly in front of a mixed reality sequence, such as a virtual tour guide in a museum, will have a different view (point of view) of the experience when compared to a user standing behind the same mixed reality sequence. Just as in real life, the user's view (point of view of the device) of the tour guide will depend on the user's location (location of the device) relative to the tour guide.

In another aspect, the mixed reality sequence is interactive. Using the tour guide example above, the mixed reality tour guide may address a specific user based on specific events or conditions. In this example, the tour guide may be programmed to address the user closest to the tour guide rather than appearing to address each user directly and at the same time.

In another aspect, lighting effects can be applied to the user's view of the mixed reality experience to enhance the experience. In one example embodiment, the lighting of real world elements, virtual world elements, or both, as displayed to the user, may be adjusted so that the lighting of both the real and virtual world elements are synchronized. Using the tour guide example above, if the real world lighting conditions are bright, but the cinematic sequence dictates that the virtual tour guide is presenting in overcast conditions, the lighting of real world elements can be adjusted such that the scene displayed to the user, through the mixed reality device, is overcast. A cinematic sequence is a sequence and/or a series of scenes that form a distinct narrative unit.

In another aspect, mixed reality objects can occlude each other as if all of the objects were in the real world; that is, real world objects can block the view of virtual world objects, and vice versa. Using the tour guide example, while presenting the tour guide may be programmed to move behind a real world object such as a fence or post. When this happens, the user's view (point of view) will show the real world object occluding the virtual tour guide just as the view of a real world tour guide may be blocked by the real world object. Similarly, if the virtual tour guide walks in front of the real world object, then the virtual tour guide would occlude the real world object.

Interactivity, lighting, and occlusion require that the location of each user, and more specifically, each mixed reality device, is known. This allows the system to properly interact with users of the system as well as to properly render occlusion and lighting effects. In the case of occlusion, for example, the location of the mixed reality device relative to real and virtual world objects must be known so that the occlusion effects can be properly determined.

In an example embodiment, the mixed reality device has a real and virtual camera. The real world camera can be a part of the mixed reality device and provides a video feed of the real world. The virtual world camera is used to display, through the mixed reality device, virtual world objects modeled in a virtual representation of the real world.

In one aspect, location data is used to align the views of the real and virtual camera. When the real and virtual cameras are aligned, virtual world objects will be displayed, through the mixed reality device, as if they existed in that location in the real world. The location data described above can be collected in a variety of ways. In some example embodiments, the mixed reality device is equipped with basic location tracking systems such as GPSs (Geo-Positioning Systems), accelerometers, and dead-reckoning systems. It was determined, however, that in smaller spaces such as rooms, these location tracking systems (the supplemental tracking system) may not provide sufficiently accurate data for the orientation and position of the device for the purposes of interactivity, lighting, or occlusion. In these example embodiments, a location tracking system was developed to provide more accurate location data for interactivity and occlusion.

In another example embodiment, the system comprises a networked hierarchy of devices: a mixed reality manager and a mixed reality client. In this example embodiment, the mixed reality clients are a set of tablets (one per visitor), and the mixed reality manager is a multi-purpose, centralised system. Each tablet plays back content locally for a given visitor, including rendering of the mixed reality visuals and playback of audio in the paired headphones. Both the visuals and audio make use of tracking data to be rendered as though from the appropriate virtual spatial location and/or virtual spatial orientation: the visuals are drawn from the matching virtual position and viewing angle, and audio is panned left and right to create the effect of virtual character voices coming from an appropriate direction. Thus, the tablet layer of the experience gives each visitor the sense of having their own point of view of the virtual events.

In this example embodiment, these tablets each communicate with the centralised mixed reality manager, which in turn plays two roles: Firstly, it provides a full-room surround-sound audio experience, such as ambient sounds, heard by all visitors in a given group. This provides a depth of audio that may not be possible (grammatical error) with the tablets' headphones alone and reinforces the sense that the experience is a shared one between members of the visiting group. Secondly, the room-experience server is configured to coordinate with each connected mixed reality client in order to synchronise the tablet layer (device layer) of the experience across all connected mixed reality clients and with the shared experience provided by the room audio. Although the mixed reality client layer of the experience is unique to each visitor, by coordination with the central system in this way, those experiences are made to be in sync on a per-event basis; that is, each visitor sees the same events, but played out from a different perspective; it will be appreciated that the perspective is unique to the individual point of view of each visitor. Thus, the mixed reality manager in combination with the mixed reality clients are able to provide an experience which is layered and shared.

In this example embodiment, interactivity may be accomplished through communication between the mixed reality clients and mixed reality manager. Each mixed reality client regularly sends status information back to the mixed reality manager, including such information as the location of the mixed reality client within the space. This information (along with parameters like the passage of time) is used by the mixed reality manager as part of a state-based triggering system, allowing the location of a given visitor to affect events such as, for example, whether or not a virtual character may address them.

In another aspect, a method for displaying a mixed reality cinematic scene on one or more mixed reality devices is provided. In one example embodiment, the method comprises the steps of determining a (spatial) location and a (spatial) orientation (generally, spatial data) of the one or more computing devices each having a camera, mapping the spatial location and/or the spatial orientation (spatial data) of each of the one or more computing devices into a mixed reality manager, and presenting an event that is shared among the one or more computing devices, and the presenting of the event is experienced simultaneously and varies among each of the one or more computing devices depending on the location or the orientation or both.

In another aspect, a system is provided for displaying a simultaneous mixed reality to one or more users. In one example embodiment, each of the one or more computing devices provides, for example, an output, a camera input, a location, and an orientation of the camera input, etc. The system for sharing a mixed reality between one or more computing devices comprises a mixed reality manager for coordinating an event among the one or more computing devices based on the spatial location (spatial data) and the view point (point of view or POV) for each of the one or more computing devices, and a mixed reality renderer for rendering the event simultaneously on the output of the one or more computing devices; the rendering of the event varies among each of the one or more computing devices depending on the location or the view point or both.

In order to mitigate, at least in part, the problem(s) identified, in accordance with an aspect, there is provided other aspects as identified in the claims.

Other aspects and features of the non-limiting embodiments may now become apparent to those skilled in the art upon review of the following detailed description of the non-limiting embodiments with the accompanying drawings.

DETAILED DESCRIPTION OF THE DRAWINGS

The non-limiting embodiments may be more fully appreciated by reference to the following detailed description of the non-limiting embodiments when taken in conjunction with the accompanying drawings, in which:

FIG. 1 depicts an example embodiment system with a plurality of users, each having their own mixed reality device, simultaneously viewing a mixed reality event;

FIG. 2AA depicts an example of a system diagram of an example embodiment of the system;

FIGS. 4A to 4C depict examples of a representative drawing of example embodiments of the virtual camera and real camera in various states of alignment;

Figure 1:
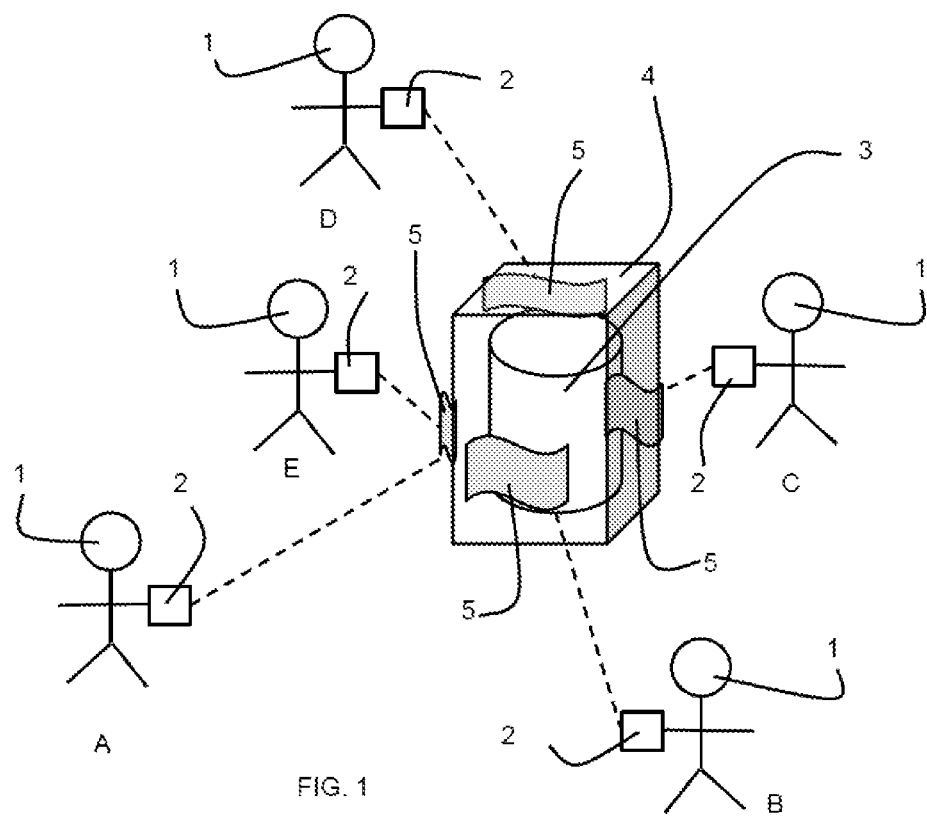

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating an understanding of the various presently disclosed embodiments. In addition, common, but well-understood, elements that are useful or necessary in commercially feasible embodiments are often not depicted in order to facilitate a less obstructed view of the various embodiments of the present disclosure.

LISTING OF REFERENCE NUMERALS USED IN THE DRAWINGS 1 end user
2 mixed reality device
3 real world content
4 virtual world content
5 perspective
130 tracking assembly
200 mixed reality manager
210 tracking server
220 experience server
221 mapping system
222 state machine
230 global audio system
240 mixed reality client
250 tracking client
260 experience client
262 state machine
270 local audio module
280 experience system
301 room
302 timer
303 predefined trigger zone
304 cinematic
305 virtual battle sequence
401 real word camera
402 virtual world camera
700 receiver array
701 real world posts

DETAILED DESCRIPTION OF THE NON-LIMITING EMBODIMENT(S)

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of the description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise. It is understood that "at least one" is equivalent to "a". The aspects (examples, alterations, modifications, options, variations, embodiments and any equivalent thereof) are described with reference to the drawings. It will be understood that the invention is limited to the subject matter provided by the claims, and that the invention is not limited to the particular aspects depicted and described.

FIG. 1 depicts an example embodiment system with a plurality of users, each having their own mixed reality device, simultaneously viewing a mixed reality event (also called a mixed reality content).

An example embodiment of how an example system may be used is provided in FIG. 1. In this example embodiment, a group of users 1 each have their own mixed reality device 2. Each user views, through their mixed reality device 2, a real-world object or location 3 and a virtual object or a virtual sequence (also called virtual world content 4 or virtual world object or virtual world objects) that is associated with that real world object or real world location (also called real world content 3 or real world object or real world objects). In an example embodiment, the object may be a scripted virtual character.

In this example embodiment, each viewer (A-E) will have a different perspective 5 (also called a point of view or POV via their instance of the device 2) of the mixed reality event (the virtual world content 4), and the POV will depend on the spatial location data and/or spatial orientation data (spatial data) of the mixed reality device 2. In this example embodiment, the mixed reality event is partially pre-rendered on each mixed reality device 2. The mixed reality event (having the real world content 3 and the virtual world content 4) displayed to the viewer (via the display of the device 2 associated with the user) will be influenced by the spatial data (the spatial location data and/or spatial orientation data) of the mixed reality device 2 relative to the real-world object or location (real world content 3). In this example embodiment, the mixed reality event is a cinematic movie rendered by a game engine (such as, for example the UNITY engine), and the UNITY engine may account for the spatial location (spatial data) of the device 2 relative to the real-world object or location (real world content 3). The UNITY game engine is manufactured by UNITY Technologies, San Francisco, Calif., United States.

In the example embodiment shown in FIG. 1, five viewers (A-E) each having their own device 2 surround a real world object (real world content 3) that has a virtual world event (virtual world content 4) associated with the real world content 3. When the virtual world event (virtual world content 4) is triggered, each mixed reality device 2 will render (display) the scene, in which the scene (to be displayed on the device 2) is a combination of the virtual world content 4 and the real world content 3 from the point of view of a selected instance of the device 2; each instance of the device 2 will have a respective point of view (POV) or a different point of view (POV) in comparison to the other devices 2 that have different (respective) POVs, depending on the spatial data (the spatial position) of a particular device 2. In this example embodiment, the viewer A will have a left side view of the mixed reality event, which is a combination of the virtual world content 4 and the real world content 3, at a distance (spatial distance and/or spatial orientation). The viewer E will have also have a left side view of the mixed reality event, but zoomed in since the viewer E is positioned closer to the mixed reality event. The viewer C will have a right side view of the mixed reality event, but zoomed in since the viewer C is positioned closer to the mixed reality event. The viewer B will have a front view of the mixed reality event. The Viewer D will have a view of the rear of the mixed reality event. Each viewer (A-E) will view the display of their device 2, and the display of each device 2 will display from the point of view (POV) of the device 2 that the user is holding; the POV of one instance of the device 2 is different from the POVs of the other instances of the device 2 (since the real world cameras for each instance of the device 2 has a unique spatial position and/or orientation or POV).

In this example embodiment, the virtual world event (virtual world content 4) is rendered simultaneously on each of the five instances of the mixed reality devices 2. That is, each of the five viewers A-E (via their own instance of the device 2) will be watching the same virtual world event (virtual world content 4) but from five different perspectives (or points of view, POVs) depending on the spatial location and/or spatial orientation (spatial information or spatial data) of their device 2 relative to the virtual world event (virtual world content 4). The spatial data for each device 2 is mapped into the spatial frame that makes up the virtual world. The information displayed by the display device of the device 2 shows a mixed reality event (which is a combination of the virtual world content 4 and the real world content 3) from a point of view associated with the device 2 (as may be viewed from the real world camera of the device 2). Each instance of the device 2 will have a different point of view (POV) from the POVs of the other instances of the device 2 in the real world (since each instance of the device 2 will have different spatial positions and/or spatial orientations), and hence (as well) will have different spatial positions and/or spatial orientations in the virtual world since the spatial information for each device 2 is mapped to the virtual world.

In some example embodiments, the virtual world event (virtual world content 4) or the mixed reality event may be a continuously playing cinematic scene. In another example embodiment, the mixed reality event may be triggered when one or more mixed reality devices 2 enters a defined trigger area. In this example embodiment, an area surrounding the real world object or the real world location (real world content 3) may be pre-defined as a trigger space. Once the mixed reality device 2 crosses into the trigger space, the virtual world event (virtual world content 4) will be played (displayed) on each of the mixed reality devices 2 (in accordance with the POV associated with each respective instance of the device 2). It is expected that the devices 2 will not share the same POV since each device 2 will have their own unique POV. For instance, the virtual world content 4 includes a cinematic content rendered by a game engine (such as the UNITY game engine), and the UNITY engine will account for the spatial locations of each of the devices 2 relative to the real world content 3 when rendering the virtual world content 4 to each of the devices 2.

Figure 2A:
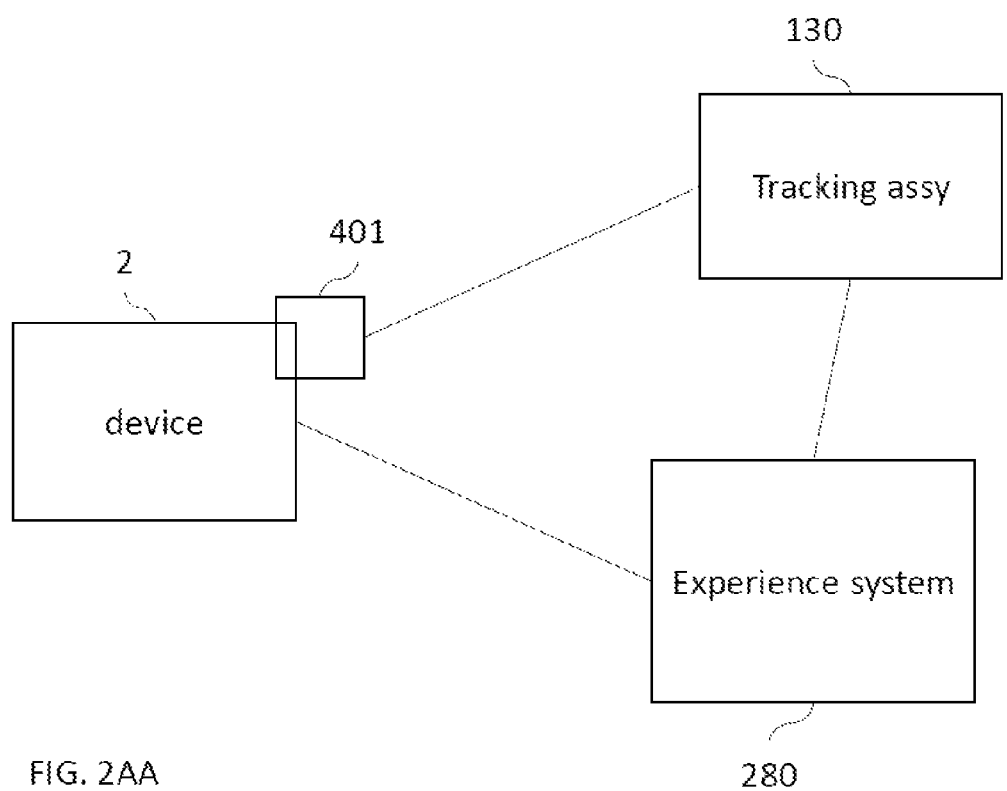
FIG. 2A depicts an example of a system diagram of an example embodiment of a mixed reality client and mixed reality server.
Figure 2A:
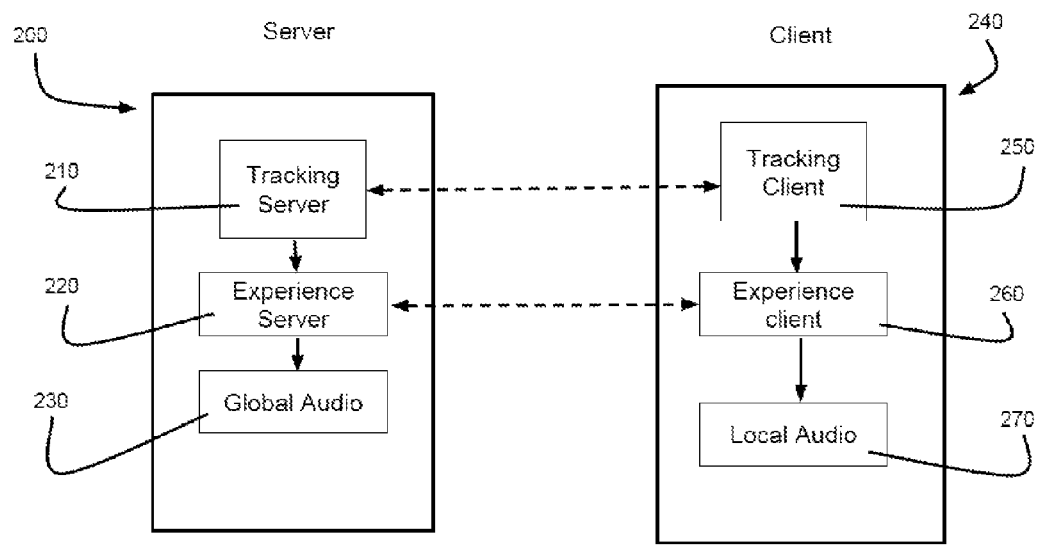

FIG. 2AA depicts an example of a system diagram of an example embodiment of the system.

Referring now to FIG. 2AA, there is depicted a system configured to perform a method described above. The system is configured to display the virtual world content (4), which may also be called a virtual reality content. The system includes the device 2 having a display, and also having the real world camera 401 (also depicted in FIGS. 2C, 4A, 4B, and 4C) of the device 2. The system also includes a tracking assembly 130 configured to determine the spatial location data and/or spatial orientation data of the real world camera 401. The system (also called an apparatus) includes the experience system 280 configured to align the virtual world camera 402 (associated with a virtual world, and is depicted in FIGS. 4B, and 4C) with the real world camera 401 of the device 2 by using tracking data provided by the tracking assembly 130. This is done in such a way that the point of view (POV) of the virtual world camera 402 is aligned with the point of view (POV) of the real world camera 401. The virtual world camera 402 is simply a virtual camera that exists in the virtual world and has a spatial position or spatial orientation that matches the spatial position data and/or orientation data of the real world camera 401 of the real word camera 401 is mapped to the virtual world).

Referring to FIG. 2AA, the experience system 280 is also configured to render the virtual world content 4. The virtual world content 4 that is rendered and the real world content 3 that is captured by the real world camera 401 are displayed on the device 2 in such a way that the virtual world content 4 appears to be captured by (and provided by) the real world camera 401 from the point of view of the real world camera 401.

In general terms, the experience system 280 includes: an alignment module, a rendering module, and a providing module. It will be appreciated that persons of skill in the art of designing systems would understand that the alignment module, the rendering module, and/or the providing module may include hardware components, software components, and/or a combination of hardware components and software components.

The alignment module is configured to align the virtual world camera in the virtual world with the real world camera 401 of the device 2; the device 2 has the display; the alignment is done by using data from the tracking assembly 130; the tracking assembly 130 is configured to determine the spatial position data and/or the spatial orientation data of the real world camera 401, so that a point of view (POV) of the virtual world camera in the virtual world is aligned with the point of view (POV) of the real world camera 401.

The rendering module is configured to render the virtual world content 4 from the point of view (POV) of the virtual world camera.

The providing module is configured to provide the virtual world content 4 that was rendered and the real world content 3 that was captured by the real world camera 401 to the display of the device 2 in such a way that: (a) the virtual world content 4 that is displayed on the display appears to be captured by the real world camera 401 in the real world: and (b) the virtual world that is displayed on the display comprises, at least in part, a virtual representation of the real world.

Computer software, or simply software, also known as computer programs, is the non-tangible component of computers. Computer software contrasts with computer hardware, which is the physical component of computers. Computer hardware and software require each other and neither can be realistically used without the other. Computer software includes all computer programs regardless of their architecture; for example, executable files, libraries and scripts are computer software. Yet, it shares their mutual properties: software consists of clearly defined instructions that upon execution, instructs hardware to perform the tasks for which it is designed. Software is tangibly stored in computer memory. At the lowest level, executable code consists of machine language instructions specific to an individual processor, such as a central processing unit (CPU). A machine language consists of groups of binary values signifying processor instructions that change the state of the computer from its preceding state. For example, an instruction may change the value stored in a particular storage location inside the computer—an effect that is not directly observable to the user. An instruction may also (indirectly) cause something to appear on a display of the computer system—a state change, which may be visible to the user. The processor carries out the instructions in the order they are provided, unless it is instructed to "jump" to a different instruction, or interrupted. Software is usually written in high-level programming languages that are easier and more efficient for humans to use (closer to natural language) than machine language. High-level languages are compiled or interpreted into machine language object code. Software may also be written in a low-level assembly language, essentially, a vaguely mnemonic representation of a machine language using a natural language alphabet. Assembly language is converted into object code via an assembler. Application software is all the computer software that causes a computer to perform useful tasks beyond the running of the computer itself. A specific instance of such software is called a software application, application program, application or app. The term is used to contrast such software with system software, which manages and integrates the capabilities of a computer but does not directly perform tasks that benefit the user. The system software serves the application, which in turn serves the user.

Various implementations of the system depicted in FIG. 2AA may be provided (as desired).

FIG. 2A depicts an example of a system diagram of an example embodiment of a mixed reality client and mixed reality server.

In the example provided in FIG. 2A, the experience system 280 and the tracking assembly 130 each have a client component on the device 2 and a server component on a separate computing device such as a server in wireless communication with the device 2. A skilled person would understand that the implementation specifics of each deployment may vary depending on the circumstances. For example, in some example embodiments, the entirety of the tracking assembly 130 may be implemented on the device 2, thus negating the need for the tracking server 210.

Referring to FIGS. 1, 2C, 2D, and 7, a device 2 is provided. The device 2 has a display (not shown) for displaying the real world content 3 and virtual world content 4. The device also has a real world camera 401 for capturing the real world content 3. In the examples shown in FIGS. 1, 2C, 2D, and 7, the device is a portable computing device. Examples of portable computing devices include, but are not limited to, laptop computers, smartphones, gaming devices, tablets, and portable media devices such as an APPLE (TRADEMARK) IPOD (TRADEMARK) device.

Referring to FIGS. 2AA, 2A, 2C, 2D, and 7, a tracking assembly 130 is provided. The tracking assembly 130 is configured to collect data regarding the spatial location and/or the spatial orientation the device 2. In the examples depicted in FIGS. 2A, 2C, 2D, and 7, the tracking assembly 130 includes a tracking server 210 and a tracking client 250.

As shown in FIG. 2A, the tracking server 210 is configured to receive tracking data from the one or more tracking clients 250. This tracking data may include, and is not limited to, the spatial location and/or the spatial orientation data of the device 2 and the real world camera 401. In the example shown in FIG. 2A, the tracking server 210 provides an agnostic connection to, and fusion between, onboard and external position and/or orientation data describing the orientation and location of the device 2 in the real world. This data is used by the experience system 280 for scaling and registering the virtual scene appropriately for each view of the device 2. The experience system 280 uses this information to inform and optimize algorithms for appropriately interlacing the real world content 3 and virtual world content 4 portions of the scene. Interlacing the real and virtual portions of the scene includes aligning the point of view (POV) of the virtual world camera 402 and the real world camera 401 so that the virtual world content 4 appears to be captured by the real world camera 401. Interlacing the real and virtual portions of the scene may also include determining occlusion characteristics between fixed objects in the real world with content from the virtual world.

Referring now to FIG. 2A, the tracking assembly 130 also includes a tracking client 250. The tracking client 250 is configured to collect tracking data of the device 2, and to forward the data to the tracking server 210. In this example, the tracking client 250 runs on a device 2 that is in wireless communication with the tracking server 210. Examples of the devices 2 can include tablet computers, portable computers such as laptops, smartphones, and portable gaming devices.

In an embodiment, the device 2 includes a tracking client 250 for tracking the spatial position data and/or the spatial orientation data of the device 2. This data is used by the experience system 280 to spatially align the virtual world camera 402 with the real world camera 401 (associated with a specific instance of the device 2) in order to align the POVs of the cameras. In other examples, the spatial location and/or the spatial orientation data may be used by the experience system 280 to map the spatial location of the devices 2 in the virtual world and to trigger events based on the spatial location data and/or spatial orientation data of the one or more devices 2 in the virtual world.

In some example embodiments, the tracking client 250 collects location data using the built-in sensors of the device 2. For example, in a setting such as an outdoor space, the spatial location data and/or spatial orientation data from the internal sensors of the device 2 may be sufficiently accurate to determine the spatial position data and/or the spatial orientation data of the device 2. For instance, location and orientation data collected from the internal sensors of the device 2 can include data from GPS (geo-positional spatial) sensors, dead reckoning systems, gyroscopic sensors, and accelerometers.

Once the data has been collected by the tracking assembly 130, the data is used by the experience system 280. Generally, the experience system 280 uses the data to align the point of view (POV) of a virtual world camera 402 with the point of view (POV) of the real world camera 401 of the device 2. In other example embodiments, the experience system 280 may be configured to map and track each device 2 used in the system in the virtual world having the virtual reality content 4.

The implementation of the mixed reality manager 200 may vary. In the example shown in FIG. 2A, the experience system 280 may have a server component and a client component. A skilled person would understand that other implementations may be provided without departing from the scope of this disclosure.

In some example embodiments, once the data is sent to the experience system 280, the experience system 280 may forward or broadcast the spatial location data and/the spatial orientation data (the spatial data) of the device 2 to other devices 2. This forwarded data can then be used by the device 2 to keep track of the spatial location of the other devices 2. The experience system 280 may also map the spatial location of each of the other devices 2 in the system. In this way, each of the devices 2 (in the system) may have spatial data regarding the spatial location data and/or spatial orientation data of the other devices 2.

Once the experience system 280 receives the spatial location data and/the spatial orientation data (the spatial data) from the device 2, the data is used to align the point of view (POV) of the virtual world camera 402 with the point of view (POV) of the real world camera 401. In order to align the two cameras, the experience system 280 must first determine the point of view (POV) of the real world camera 401.

Once the point of view (POV) of the real world camera 401 is determined, the point of view (POV) of the virtual world camera 402 can be aligned with the POV of the real world camera 401. The spatial location data and/or spatial orientation data of the device 2, as collected by the tracking assembly 130, is used by the mixed reality manager 200 to align the POV of the virtual world camera 402 in the virtual world representation of the real world with the POV of the real world camera 401. In this example embodiment, the mixed reality manager 200 aligns the virtual world camera 402 with the real world camera 401 by positioning the virtual world camera 402 in the virtual world (which is a virtual representation of the real world) in the same spatial position and/or the spatial orientation data of the real world camera 401 in the real world.

In the example provided above and using the system of FIG. 2D, the experience system 280, or more specifically the experience client 260 determines the artificial occlusion in the following manner. The experience system 280 has a mapping of the devices 2 currently used by the system. The experience system 280 also has a mapping of the virtual world content 4 in the virtual world, and a virtual representation of the real world content 3 in the virtual world. In the example provided above, the virtual world is contained in the game engine. That is, in the above example, the game engine has a representation of the real world environment, including real world content 3. This is effectively a game space, or game level. Virtual world content 4 is also included in the game engine representation of the real world. It will be appreciated that the concepts applied to a "moving real world object" may be applied to a "static real world object".

Using this data, the experience client 260 renders the virtual object so that the virtual object that is rendered appears, when displayed through device 2, in such a way that the real world content 3 occludes the virtual world content 4. The mixed reality renderer, with the information provided above, renders the virtual world content 4 so that the virtual world content 4 appears to be occluded by the real world content 3 for the case where a user is positioned in a spatial location where, logically, the virtual world content 4 may appear to be real and would therefore be occluded by the real world content 3.

In this example embodiment, the real world object is rendered in the virtual world (i.e., in the UNITY engine). In some implementations, the virtual world representation of the real world content 3 is texture mapped using data captured from the real world camera 401. This virtual world representation of the staircase can then be rendered with virtual world objects, such as the virtual barrels (depicted in FIGS. 6A and 6B), so that the objects can occlude each other when they are displayed through the device 2.

In another example embodiment, the real world object may be modeled in the virtual world as an un-textured polygon such that the un-textured polygon, when displayed through the device 2, overlays the real world content 3. In this example embodiment, the un-textured polygon overlay is partially transparent so that the real world content 3 can be seen through the overlay. In this example embodiment, the real world content 3 that would naturally occlude other objects is selected for rendering in the virtual world. Examples of such objects include, but are not limited to, structural posts, doorways, furniture, and stairs.

In another example embodiment, the moving real world objects may also be modeled in the virtual world to occlude some virtual objects. In this example embodiment, the moving real world objects must be tracked using one or more tracking apparatus as previously described. The virtual model of the moving real world object can then be textured dynamically during the experience based on the relative distance from the tracking apparatus so that the virtual model is superimposed with the moving real world object. Since the devices are always tracked during the experience, this example of occlusion for moving real world objects can be used to achieve dynamic occlusion which can occur when one user blocks the experience of another user. The moving real world objects can also include other tracked real world objects such as cars.

In another example embodiment, the experience system 280 is configured to match a lighting of the virtual world content 4 to a lighting of the real world content 3. That is, the experience system 280 is configured to adjust the lighting of the virtual world content 4 and the real world content 3 as displayed through the device 2. Generally, the illumination conditions in the real world do not match the lighting intensities of animations. If the captured real world content 3 is displayed on the device 2 without any processing, the virtual world content 4 may contrast sharply with the real world content 3, detracting from the mixed reality experience. Matching lighting and tone conditions between the virtual world content 4 and real world content 3 is important for a mixed reality system because it heightens the sense of realism and coherency when integrating virtual world content 4 with real world content 3.

Generally, lighting conditions of real world content 3 and virtual world content 4 can be matched by taking lighting samples from the real world, from the virtual world, or from a combination of both. In example embodiments, the lighting of the real world space can be used to adjust the lighting of the virtual world content 4. In this example, measurements of the ambient lighting conditions of the real world content 3 are obtained via the real world camera 401 of the device 2. That is, luminosity profiles extracted from real world camera 401 can be used to guide the dynamic adjustment of ambient lighting components of the virtual world. The lighting profile of the virtual world content 4 is then matched to the lighting conditions of the real world content 3, as captured through the real world camera 401.

In other example embodiments, the lighting conditions of virtual world can be used to adjust the lighting of the real world content 3 as viewed through the device 2. In this example embodiment, the lighting conditions are set in the virtual world. That is, the desired lighting conditions for the virtual world are known. This lighting information can then be used to modify the lighting conditions of the real world content 3 when it is displayed through the device 2.

In this example embodiment, the virtual world content 4 is sampled through the virtual world camera 402 for various poses and locations, and statistical properties from the rasterized rendering are extracted. These properties are used to guide contrast and tone enhancement via intensity transformation on the real world content 3 captured by the real world camera 401. This transformation is performed in order to match the lighting conditions of the real world content 3 to the lighting conditions of the virtual world content 4.

In yet another example embodiment, the lighting conditions of the virtual world content 4 and the real world content 3 may be adjusted based on lighting information obtained from both the virtual world and the real world. In this example embodiment, a hybrid of the two techniques as described above can be used to modify the lighting conditions of the virtual world content 4 and the real world content 3 displayed on the device 2.

In this example embodiment, the experience system 280 includes a two-way channel for estimating and matching lighting properties for the real world content 3 and the virtual world content 4. This can be performed either by extracting lighting information from the virtual world content 4 or from the real world content 3 as sampled through the real world camera 401. The lighting information is then used to dynamically match either the tone of the real world content 3 or the ambient lighting of the virtual world content 4 content respectively.

In another example embodiment, the experience system 280 is configured to display additional virtual world content 4 when a trigger condition is met. In this example, the experience system 280 includes an event tracking and triggering system. An example of an event tracking and triggering system is a state machine 222. The state machine 222 is configured to trigger virtual world content such as events and virtual world cinematic sequences when certain conditions are met, as represented by the state of the state machine 222. The state of the state machine 222 can be set by various factors that can include, but are not limited to, elapsed time, location of the one or more devices 2, number of devices 2 currently in the virtual world, time of day, and previous states of the state machine 222.

In an example embodiment, a state machine extension to a game engine, such as the UNITY engine, can be used to determine when virtual world content 4 may be triggered. Different triggers such as environmental parameters, temporal parameters, prior events, and player parameters (such as location) can be used to set state of the state machine 222. For example, the spatial location of the one or more devices 2 in the virtual world can be used to set the state of the state machine 222. The amount of time the one or more users are in the virtual world can also be used to set the state of the state machine 222. Once certain conditions are met, the state machine 222 may trigger events accordingly. The events can then be rendered by the experience system 280 and displayed accordingly.

In another example embodiment, the device 2 is configured to accept an input from a user through an input assembly, the input being used by the experience system 280 to interact with the virtual world content 4. In one such example, the experience system 280 accepts input from the device 2 through an input assembly of the device 2. For example, the virtual world content 4, in this case a virtual character, is scripted to prompt a user 1 for input through the device 2. An example of this may be a virtual character asking a question to and wait for a response from the user associated with the device 2 mapped closest to the virtual character in the virtual world. In this example embodiment, the mixed reality device may be configured to accept a response input through an input assembly such as a microphone, touchscreen, or other input device. The experience system 280 would then accept the input and cause the virtual character to respond to the provided input.

In another example, the system is configured to perform an audio content associated with the virtual world content 4 on the device 2. In an example, the experience client 260 includes a local audio module 270 is configured to perform a localized audio experience to the user 1 of the device 2. In an example embodiment, the virtual world content 4 may have audio associated with it. The audio, for the purposes of realism, may originate from the location of the mixed reality event. For example, dialog may seem to be coming from the location of the virtual world content 4 and not the other end of the real world space. In an example embodiment, the gaming engine used by the experience client 260 can also handle localized audio. Thus, the mixed reality event may have associated audio properties. This audio playback may then be adjusted based on the location of the device 2. For example, if the virtual reality content 4 occurs at the far end of the space relative to the location of the device 2, then the audio may be adjusted so that it sounds like the virtual reality content 4 is originating from the far end of the space. In this example embodiment, the UNITY gaming client is capable of adjusting audio properties based on the location of the device 2. This can include lowering or panning audio levels based on the distance of the device 2 from the event, or adjusting audio levels in response to global audio settings.

In another example, the experience system 280 is configured to perform an audio content. In this example, the experience system 280 includes a global audio system 230 is configured to perform an audio content in the real world. In the example embodiment of the virtual battle sequence 305 described in FIG. 3, the experience system 280 may use a global audio system 230 to enhance the experience for all users 1 without the need to play the audio through the device 2. For instance, in a mixed reality explosion, the global audio system 230 may be used to play an explosion effect through speakers hidden in the space. This explosion effect may also be replicated at the mixed reality device 2 at the same time. This creates the auditory illusion that the room is exploding. A skilled technician would understand that other systems, such as lighting or vibration systems, may also be used to enhance the experience of all users in the space.

Figure 2B:
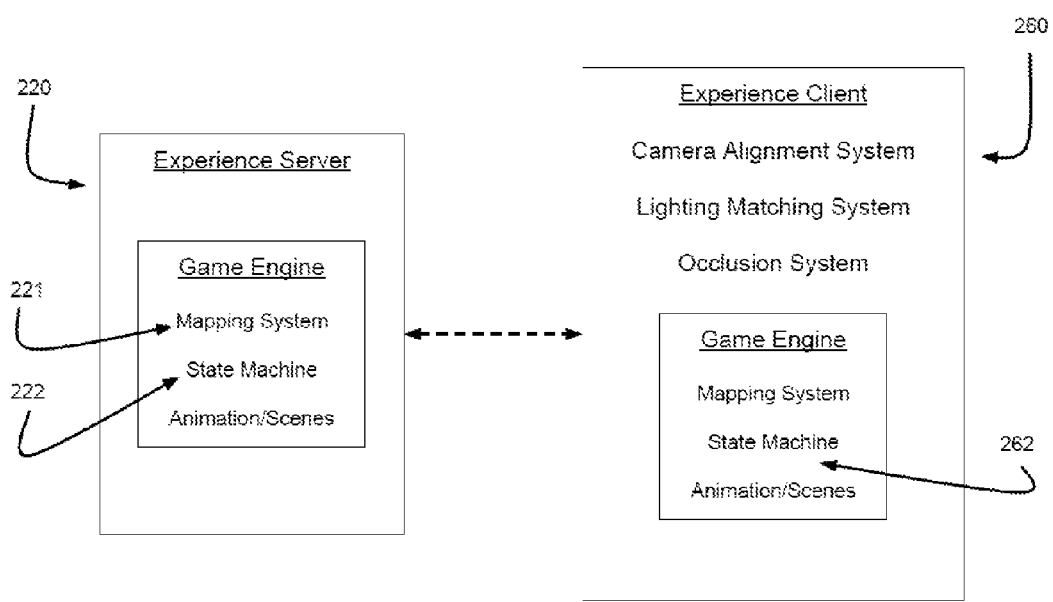
FIG. 2B depicts an example of a system diagram of an example embodiment of the experience server and the experience client.

FIG. 2B depicts an example of a system diagram of an example embodiment of the experience server and the experience client.

In the example shown in FIG. 2B, functionality described above is implemented in the experience client 260. That is, the experience client 260 includes the lighting matching system, the occlusion system, and the game engine. In the embodiment depicted in FIGS. 2B and 2D, the experience system 280 includes a game engine such as the UNITY engine. The game engine is used to map the virtual world, and render the virtual content in the virtual world. Add-ons or plug-ins to the game engine can also be included and are used to determine occlusion, match lighting between the virtual world content 4 and the real world content 3, and track the state of the virtual content so that virtual content can be triggered based on the state of the system.

This virtual world content 4 is then displayed, along with the captured real world content 3 on the device 2. The experience client 260 is also configured to mix the virtual world content 4 (as seen from the POV of the virtual world camera 402) and a corresponding real world content 3 (as seen from the perspective or POV of the real world camera 401), thereby providing a mixed reality view. In the example shown in FIG. 2D, the UNITY game engine is configured to mix the rendered virtual world content 4 with the real world content 3. Essentially, the real world content 3 is captured by the real world camera 401 and rendered as a background to the virtual world content 4. In some circumstances, as discussed later, virtual world content 4 may be pre-rendered in the game engine as a polygon in the virtual world for the purposes of determining occlusion.

In another aspect, the virtual reality content is displayed simultaneously on a plurality of devices 2. The virtual reality content 4 displayed on each of the devices is rendered from the POV of the real world camera 401 of each of the plurality of devices 2.

The experience system 280 is configured to handle a plurality of devices 2 at any given time. When a plurality of devices 2 is using the system, each device 2 is individually tracked by the tracking assembly 130. The experience system 280 is then able to align the virtual camera and the real camera of each device 2 so that each device 2 has its own POV relative to the virtual world content 4 and real world content 3. Thus, when the virtual world content 4 is rendered, each device 2 has its own view (POV) of the virtual world content 4 from its own POV, and each device 2 viewing the virtual world content 4 simultaneously (but viewing the content from their own respective POV associated with their instance of the device 2).

Figure 2C:
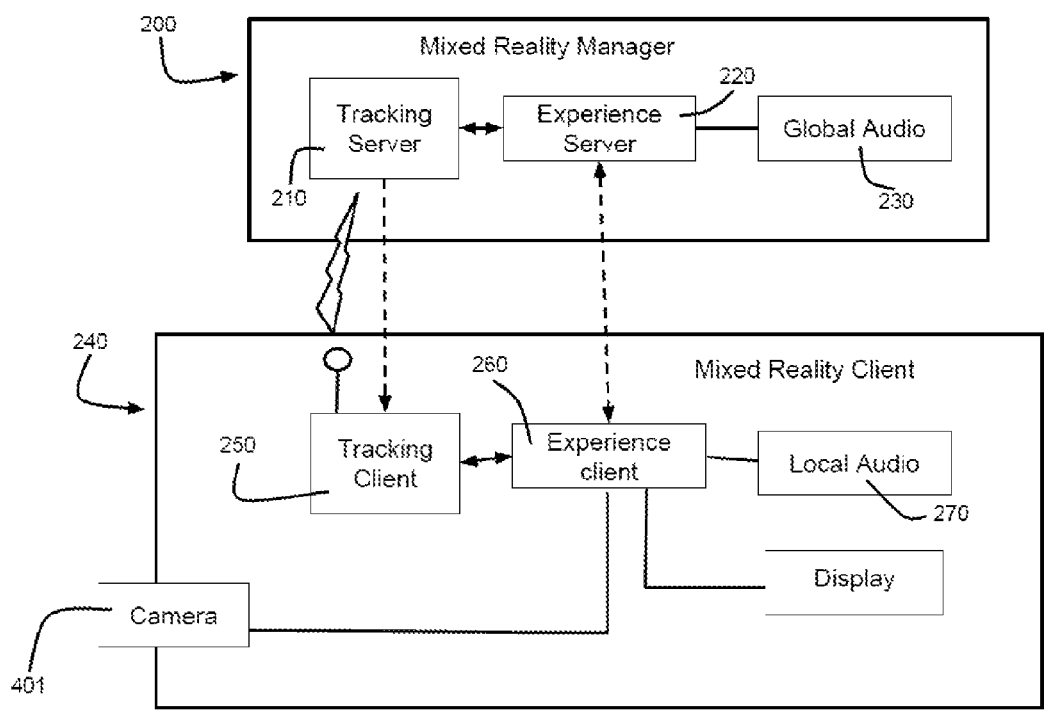
FIG. 2C depicts an example of a system diagram of an example embodiment of the mixed reality manager and client.

FIG. 2C depicts an example of a system diagram of an example embodiment of the mixed reality manager and client.

In the example embodiment shown in FIG. 2C, the multiplayer functionality of the UNITY game engine was used to render virtual world content 4 for all of the devices 2 so that the devices 2 each simultaneously view the same virtual world content 4, each from its own POV. The multiplayer functionality of the UNITY game engine is also used to map the location of each device 2 in the virtual world. In this example embodiment, the UNITY game engine is customized to provide for mapping the mixed reality devices 2 in a virtual space, aligning a real world camera 401 and a virtual world camera 402, matching lighting, and determining occlusion.

In another example, the experience system 280 is configured to operate on a computing device that is separate from the device 2, and/or is configured to wirelessly connect to the device 2.

Referring now to FIGS. 2A to 2D, the system can be separated into a client-server architecture, with the devices 2, as clients, in communication with a central server. In this case, the server side may be responsible for functionality such as the overall tracking of the devices 2, managing the state machines 222, and managing the game experience. The client devices 2 may be responsible for rendering their respective view of the virtual world content 4 and the real world content 3. A skilled person would understand that alternate architectures may be used without departing from the scope of this disclosure. For instance, a peer-to-peer relationship may be used whereby one device 2 is designated the manager/client, and is configured to handle the functionality of both the above referenced client and server. All other devices 2 would then be clients to the manager or client device 2. In another implementation, the experience system 280 may be run entirely on a server, with the devices 2 being thin clients configured only to capture data through the real world camera 401, display content streamed from the server, and provide the spatial location data and/or spatial orientation to the tracking assembly 130.

In another aspect, the experience system 280 is configured to determine artificial occlusion of the virtual world content 4 so that the virtual world content 4 occludes, or is occluded by, the real world content 3.

Figure 2D:
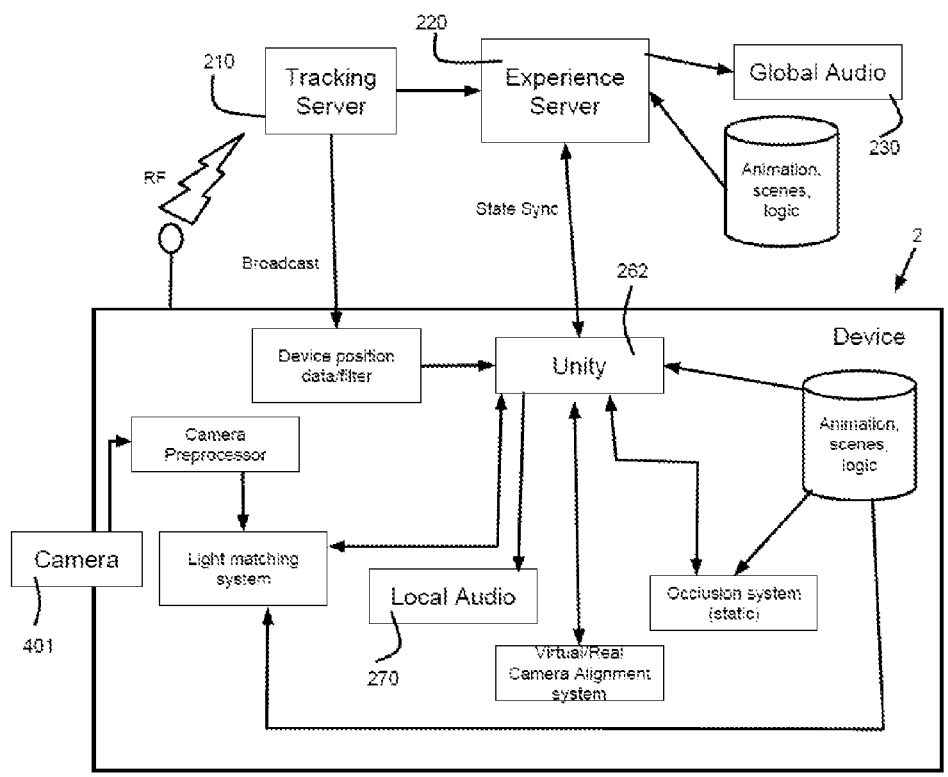
FIG. 2D depicts an example of a system diagram of an example embodiment of the device and server.

FIG. 2D depicts an example of a system diagram of an example embodiment of the device and server.

FIGS. 2A to 2D depict examples of system diagrams for mixed reality systems. Generally, the mixed reality system comprises: a mixed reality manager 200, and a mixed reality client 240. The mixed reality manager 200 comprises: a tracking server 210; an experience server 220; and a global audio system 230 (also called a global audio module). The mixed reality client 240 comprises: (A) a tracking client 250 for tracking the location of the mixed reality device and communicating the location data to the mixed reality manager; (B) an experience client 260 for presenting the mixed reality to the user, where the presentation of the mixed reality may be affected by the spatial data (spatial position) of the mixed reality device 2; and (C) a local audio module 270.

In this example embodiment, the system is interconnected using a client-server configuration, though a skilled technician would understand that other system configurations, such as peer-to-peer, may be used without departing from the scope of this disclosure.

FIG. 2D depicts an example of a system diagram of an example embodiment of the device and server.

Mixed Reality Manager

In an example embodiment of the system, the mixed reality manager 200 runs on a a server. In this example embodiment, the mixed reality manager 200 comprises a tracking server 210, an experience server 220, and a global audio system 230.

Tracking Server

In one aspect of the mixed reality manager 200, a tracking server 210 is provided for tracking the location of one or more mixed reality devices 2. In some example embodiments, the mixed reality devices 2 are located in a space such as a room. In other example embodiments, the mixed reality devices 2 may be used in a large area such as a field.

In an example embodiment, the tracking server 210 provides agnostic connection to and fusion between onboard and external position/orientation data describing the pose and location of the device in the shared space, which is used by the gaming engine for scaling and registering the virtual scene appropriately for the POV of each device 2. The mixed reality engine uses this information to inform and optimize algorithms for appropriately interlacing real and virtual portions of the scene (e.g., implementing occlusion between fixed objects in the real space with virtual content).

In this example embodiment, the location data of the device 2 is determined at least in part through the receiver array 700, which is then sent through the tracking client 250 to the tracking server 210. The supplemental tracking apparatus may be attached to, and in communication with, the tracking client 250 on the device 2. The tracking client 250 can then process the data obtained from the supplemental tracking apparatus before transmitting the data to the tracking server 210.

In an example embodiment, a six-degree of freedom (DOF) EM tracking system is used. Specifically, a POLHEMUS G4 tracking system is used. However, alternative tracking systems can be used (optical/machine vision tracking, wireless tracking, etc.) to provide both accuracy and tolerance. In an example embodiment, the six degree of freedom (DOF) EM tracking system is used as a supplemental tracking apparatus.

Experience Server

In another aspect, the mixed reality manager 200 comprises an experience server 220. In an example embodiment (as shown in FIG. 2B), the experience server 220 comprises a mapping system 221 for mapping the one or more tracked instances of the mixed reality devices 2 in a virtual space. The experience server also comprises a state machine 222 for tracking the state of the mixed reality experience. The state of the mixed reality experience can, for example, determine when specific mixed reality sequences are presented to the one or more mixed reality devices.

In this example embodiment, the experience server is a server-side component of a multiplayer gaming engine. The gaming engine can be configured to provide both a mapping system 221 and a state machine 222 for the experience server 220.

Multiplayer gaming engines are typically used by game developers to build games. These engines include tools and functionality to abstract away from the developer many of the technical implementation aspects of game development so that the game developer can focus on making the game. These tools may include, but are not limited to, sprite and/or model animation and rendering, defining or mapping a level or play area, physics engines, lighting effects, audio effects, camera positioning, event scripting and triggering based on the state of a state machine, and rendering the visuals of the game environment.

While game engines can be built in-house, commercially available frameworks are available. In this example embodiment, a commercially available gaming engine (the UNITY engine) is used. A skilled technician would understand that alternate engines may be used without departing from the scope of this disclosure. For example, the UNREAL gaming engine (see the Internet for contact details) or a custom built gaming engine may be used without departing from the scope of this disclosure.

In one example embodiment, in order to map the spatial data (spatial position, etc.) of the one or more mixed reality device 2 in virtual space, the gaming engine has an internal representation of the physical area. In this example embodiment, the physical dimensions and any characteristics of the real-world space are virtually represented in the UNITY engine. For example, the walls, structural beams, ceiling, floor, stairs, and any other real world objects are mapped in the level mapping engine of the UNITY engine. Additional assets, such as virtual chairs, decorations, and objects may also be included in the virtual mapping.

In some example embodiments, location data is provided to the experience server 220 from the tracking server 210. This location data is then used to map each of the mixed reality client 240 in the virtual space. In other example embodiments, the experience client 260, which is discussed later, forwards device location data to the experience server 220. A skilled technician would understand that alternate data pathways may be used to provide location data to the experience server 220 or the experience clients 260 (as discussed later) without departing from the scope of this disclosure. For instance, in some example embodiments, it may be preferable to have the experience client 260 send location information to the experience server 220. In this example embodiment, the location data can be supplemented by additional data from the mixed reality device 2 before the data is sent to the experience server 220. Example supplemental data can include, and is not limited to, orientation and positioning information.

In some example embodiments, the location data from the tracking server 210 (also called a tracking system) may need to be transformed prior to forwarding the data to the experience server 220. For instance, in example embodiment, the UNITY engine expects positioning data to be formatted in a specific manner. In this case, a simple transform was sufficient to translate location data to UNITY-compatible location data.

When the location data is sent to the UNITY engine of the experience server 220, the experience server 220 can then map the location of the one or more mixed reality devices 2 in the UNITY engine's virtual representation of the space. The experience server 220 then broadcasts the location of every mixed reality device 2 to all of the other instances of the mixed reality devices 2. Thus, the experience server 220 and every mixed reality device 2 knows the location of every mixed reality device 2 in the virtual space (virtual world) and the physical space (real world).

In another example embodiment, the experience server 220 (also called an experience manager) comprises an event tracking and triggering system. In some example embodiments, this is implemented as a state machine 222 that may trigger specific events and/or mixed reality sequences based on the state of the state machine. The state of the state machine 222 can be set by various factors that can include, but are not limited to, time elapsed, location of the one or more mixed reality devices, number of mixed reality devices in use, time of day, and previous states.

In this example embodiment, a state machine extension to the UNITY engine is used to determine when certain events may be triggered. Different environmental, temporal, prior events, and player parameters (such as location) can be used to set state of the state machine 222. In this example embodiment, the location of the one or more of the devices 2 (also called mediated reality devices) can be used to set the state of the state machine 222. The amount of time the one or more users are in the space can also be used to set the state of the state machine 222. Once certain conditions are met, then the state machine may trigger events accordingly.

Figure 3:
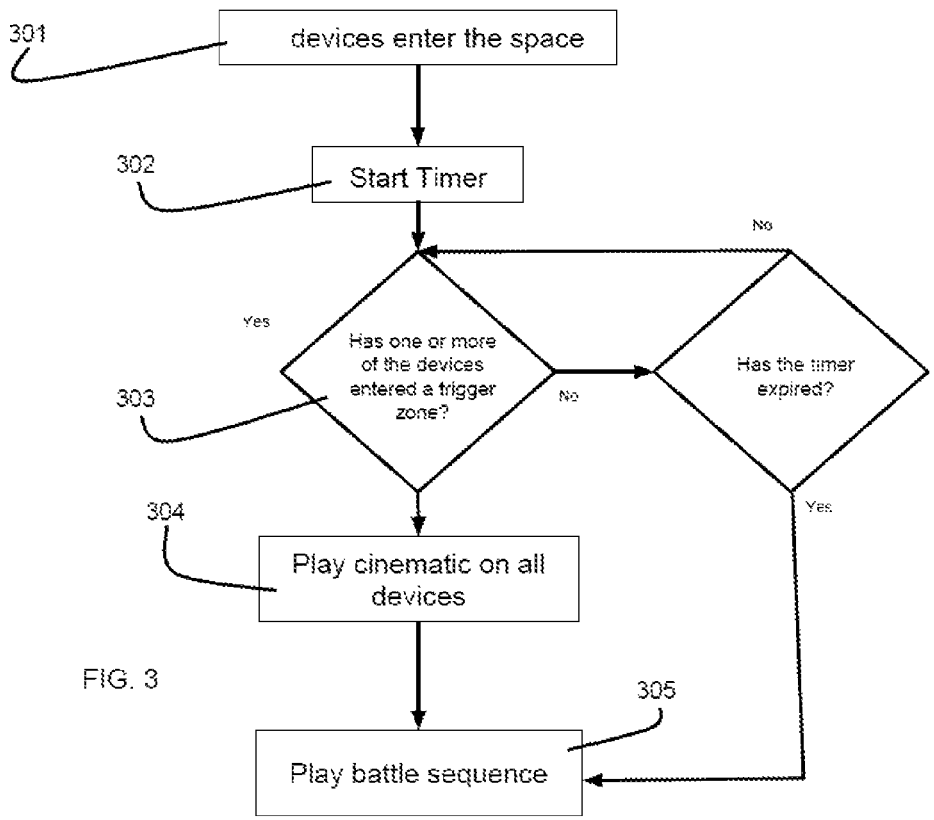
FIG. 3 depicts an example of a flowchart of an example embodiment of the state machine logic for an interactive cinematic movie.

FIG. 3 depicts an example of a flowchart of an example embodiment of the state machine logic for an interactive cinematic.

In the example embodiment provided in FIG. 3, a flowchart describes how the state machine 222 is used to trigger the virtual world content 4, such as a battle event. In this example embodiment, all of the mixed reality devices 2 are being location tracked (by using the tracking assembly 130), as described above. When all of the mixed reality devices 2 (that are being tracked) enter a predetermined location, such as a room 301, a timer 302 is started. In this example embodiment, the experience server 220 (experience system 280) tracks the location of the mixed reality clients 240 and triggers the state machine 222 to start the timer 302. The experience server 220 may also notify each of the experience clients 260 on the mixed reality clients 240 of the state change (i.e., that the timer 302 is active). This is done to ensure that the state of the experience client 260 and the experience server 220 are synchronized and/or the state of the state machines 262 of all the devices 2 is synchronized. A skilled technician would understand that alternate ways of triggering and synchronising state changes may be used without departing from the scope of this disclosure. For example, each experience client 260 may maintain its own state machine 262 and send updates to the experience server 220. As the experience server 220 receives the updates, it may reconcile unsynced (unsynchronized) instances of the experience clients 260 by telling these experience clients 260 to switch state.

Once the experience system 280 has aligned the virtual world camera 402 with the real world camera 401, the experience system 280 renders virtual world content. In other example embodiments, the experience system 280 may also be configured to determine the occlusion properties of virtual reality content in the real world. The experience system 280 may also be configured to match the lighting of virtual world content with the lighting of the real world content, or vice versa.

Referring to FIG. 3, in an example embodiment, as the mixed reality clients 240 explore the space, if one or more of the mixed reality clients 240 enters a predefined trigger zone 303, then the state machine 222 is updated and a short cinematic 304 is played on some (or all) of the devices 2. Once the short cinematic 304 has completed, then the battle sequence 305 starts. Alternatively, if none of the users 1 enters the predefined trigger zone 303, then the battle sequence 305 may begin once the timer 302 expires, regardless of whether the cinematic 304 has played. A skilled technician would understand that other scenarios may also be implemented using the state machine, and that the scenario implemented would depend on the desired experience.

Global Audio Module

In another aspect, the mixed reality manager 200 may comprise a global audio system 230 for providing space-wide audio. In the example embodiment of the battle sequence 305 described in FIG. 3, the mixed reality manager 200 may use a global audio system 230 to enhance the mixed reality experience for some or all users. For instance, in a mixed reality explosion, the global audio server may be used to play an explosion effect through speakers hidden in the space. This explosion effect may also be replicated at the mixed reality device 2 at the same time. This creates the auditory illusion that the room is exploding. A skilled technician would understand that other systems, such as lighting or vibration systems, may also be used to enhance the experience of all users in the space.

Mixed Reality Client

In another aspect, the system comprises one or more mixed reality clients 240. In an example embodiment, the mixed reality clients 240 are configured to run on the mixed reality devices 2.

The mixed reality devices 2 are configured to present the mixed reality to the users 1 of the system, and each user generally has his or her own mixed reality device 2. Generally, the one or more mixed reality devices 2 are portable, and are configured to communicate with the mixed reality manager 200 to provide information such as location, and are capable of displaying a mixed reality experience to the user. In an example embodiment, the mixed reality client 240 comprises a tracking client 250, an experience client 260, and a local audio module 270.

In some example embodiments, the mixed reality device 2 is a portable computing device such as tablet computers, laptops, smartphones, and wearable computers. In this example embodiment, tablets having a front facing camera, displays, WIFI (TRADEMARK) capabilities, and tracking transmitters are used. Examples of such devices include APPLE IPAD (TRADEMARK) devices and/or GOOGLE NEXUS 10 (TRADEMARK) tablets. A skilled technician would understand that alternate devices, such as wearable computers, smartphones, GOOGLE GLASS (TRADEMARK) device, or purpose-built devices, may be used without departing from the scope of this disclosure.

Tracking Client

In an embodiment, the mixed reality client 240 comprises a tracking client 250 for tracking the location of the mixed reality device 2. As was discussed earlier, in an example embodiment, this location data is used by the mixed reality manager 200, and specifically the experience server 220 (also called an experience manager), to trigger events and to map the location of the one or more mixed reality devices 2 in the space. In another example embodiment, the location data is used to align the real and virtual cameras.

In some example embodiments, the tracking client 250 collects location data using the built-in sensors of the mixed reality device 2. For example, in a setting such as an outdoor space, location data from the internal sensors of the mixed reality device 2 may be sufficiently accurate to determine the spatial location of the device 2 for the purposes of this disclosure. This can include data from internal sensors such as, for example, GPS (Geo-Positional System), dead reckoning, gyroscopes, and accelerometers.

However, in an indoor environment it was determined that the built-in tracking abilities of the tablet computers (currently existing) used as the mixed reality devices 2 were not sufficiently accurate for use in the system. Some example devices commercially available at the time of this disclosure include GOOGLE NEXUS (TRADEMARK) device, APPLE IPAD (TRADEMARK) device (with a retina display), APPLE IPAD MINI (TRADEMARK) device, and MICROSOFT (TRADEMARK) SURFACE PRO device.

In these example embodiments, the tracking client 250 (FIG. 2A) includes a supplemental tracking system to improve the accuracy of the tracking data to track the spatial location data and/or spatial orientation data of the device 2. In one example embodiment, a secondary tracking system is used in combination with the stock tracking abilities of tablet computers in order to obtain reasonably accurate tracking data for the mixed reality device 2.

Tracking System

Figure 7:
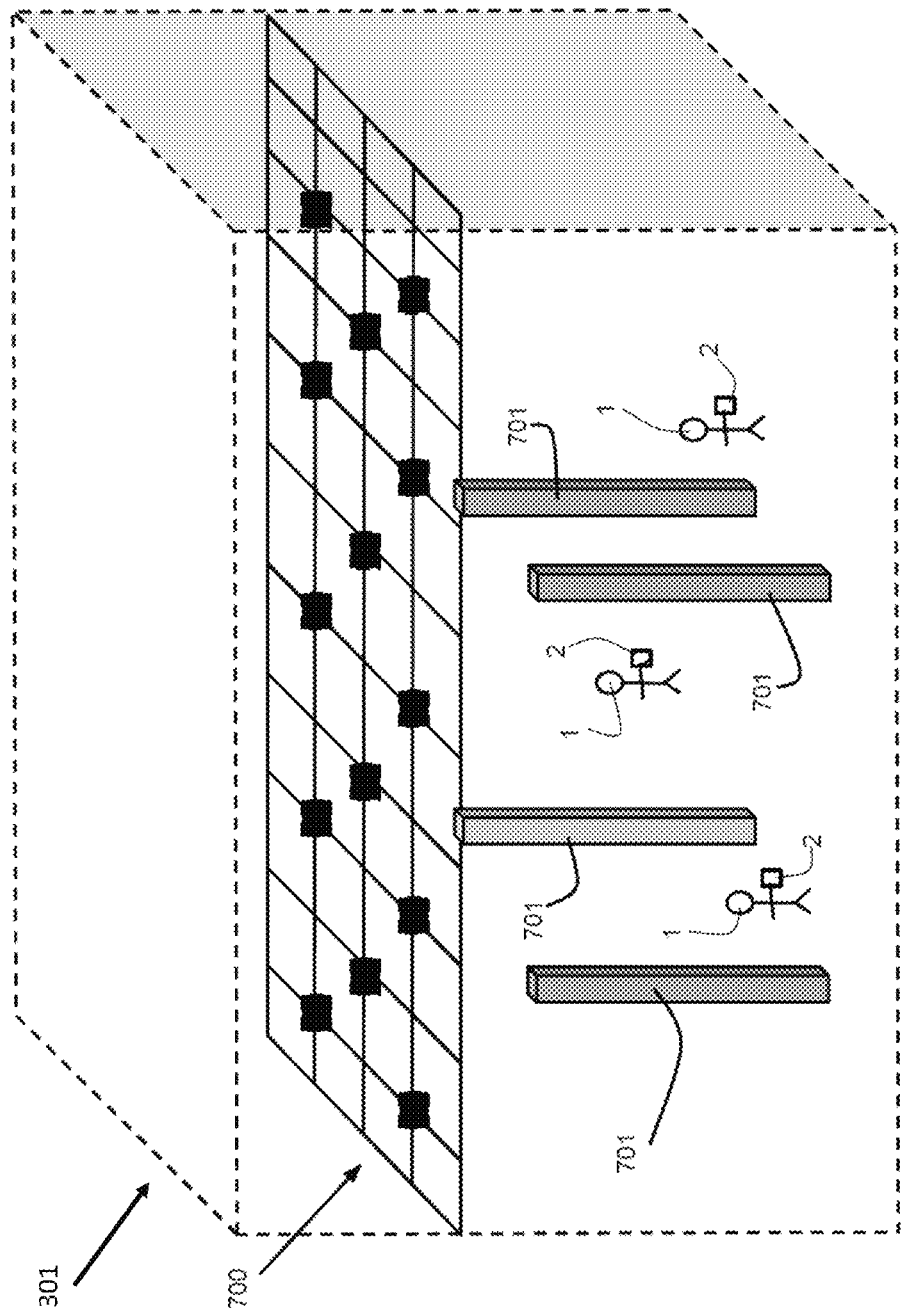
FIG. 7 depicts an example of a perspective view of a room with an example embodiment of the receiver array and system installed.

FIG. 7 depicts an example of a perspective view of a room 301 with an example embodiment of the receiver array 700 and system installed.

In an example embodiment, the secondary tracking system is a radio frequency (RF) tracking system. An example of such a system is provided in FIG. 7. The RF system comprises an array of receiver arrays 700 (also called a receiver array) configured to triangulate the position of a RF transmitter (not shown) attached to the mixed reality device 2 in order to determine the spatial position and/or spatial orientation data of the mixed reality device 2 in the space defined by the receiver array 700.

The location data of the mixed reality device 2, as determined through the receiver array 700, is then sent through the tracking client 250 to the tracking server 210 for processing. In some example embodiments, the data may be sent to the mixed reality manager 200. In this example embodiment, the mixed reality manager 200 may be configured to use the incoming data to track the location of the mixed reality devices 2 and to broadcast the location of the mixed reality devices 2 to the other instances of the mixed reality devices 2. In this example embodiment, the supplemental tracking apparatus may be attached to, and in communication with, the tracking client 250 on the device. The tracking client 250 can then process the data obtained from the supplemental tracking apparatus before transmitting the data to the tracking server (210).

A person skilled in the art would understand that alternative ways of obtaining reasonably accurate tracking data may be used without departing from the scope of this disclosure; for example, techniques employing machine vision and image processing (such as SLAM—Simultaneous Location and Mapping) may be used to track changes in the spatial orientation of the device 2. In SLAM-based approaches, static locations from the scene are detected and mapped in initial image frames, and then tracked over successive image frames as the device is moved. The moving locations are used to predict the changing spatial location and spatial orientation of the camera.

In some circumstances, the amount of data being sent to the tracking server 210 and subsequently broadcast to the mixed reality devices 2 may exceed the bandwidth limitations of the network. In these circumstances, it was determined that downsampling and filtering the tracking data sent to the tracking server 210 helped to reduce network bandwidth usage. In this example embodiment, the downsampling is performed by the tracking server 210, though a skilled technician would understand that downsampling the data may be performed at some earlier or later period of time (prior to sending the data to the tracking server 210). For example, the secondary tracking system (or the tracking client 250) may be configured to downsample the data prior to sending the data to the tracking server 210.

In an example embodiment (FIG. 7), the secondary tracking system (also called the supplemental tracking system) sends data to the tracking server 210 at 120 samples per second (s/s). This data is then downsampled (by the tracking server 210) to 60 samples per second (s/s). A skilled technician would understand that the degree the data can be downsampled may depend on the accuracy required and the environment in which the tracking system is used. For instance, in some larger spaces where users are largely stationary, further downsampling may be implemented (if desired).

It was noticed that jitter can be introduced into the system when using the secondary tracking system (supplemental tracking system). Jitter, or large errors in tracking, can lead to an unpleasant viewing experiences. For example, jitter can cause the cameras, and hence the views through the mixed reality device 2, to jump around or shake unnaturally. It was determined that the jitter effects may be corrected by applying a filter to remove any extreme, noisy, or incongruent data. In an example embodiment, a single pole low-pass filter was used to remove incongruent data from the tracking data. A skilled technician would understand that any suitable filter may be used to reduce jitter. For instance, in an electromagnetically noisy environment, a multi-pass filter may be required to remove data that would contribute to jitter. A skilled technician would also understand that the filter may be applied at any time—that is, as the data is collected, before the data is transmitted to the tracking server 210, or at the tracking server 210 itself In some embodiments, the RF tracking system may not provide sufficient data regarding the orientation and/or position of the device 2. For instance, in this example embodiment, the RF system provides horizontal direction data but does not provide other spatial data such as pitch, yaw, or roll. This can result in a mixed reality experience that, from the user's perspective, is jittery, choppy, or suffers from misalignment between the real and virtual world cameras. To address these issues, in some example embodiments, supplementary position and orientation data is collected by the mixed reality device 2 to improve the location data and the overall user experience. It was determined that the tracking accuracy of the combined system was improved, on average, by two to three degrees when compared to the external tracking hardware alone.

An example embodiment pseudo-algorithm for downsampling and filtering data, and how the data is used in an example tracking system is provided below:

```
At the tracking server 210:
For each sensor [i] (also called the real world camera) attached to
mediated reality device [i]:
    receive (position, orientation)_i
    (position', orientation')_i = downsample ((position, orientation)_i)
    (position'', orientation'')_i = low_pass_filter ((position, orientation)_i)
    send (position'', orientation'')_i to mediated reality device [i]
end for
At the mixed reality device [2]:
send (position, orientation) of attached sensor to tracking server
wait for filtered and downsampled (position'', orientation'')
(position''', orientation''') = Tracking_to_Unity_Transform ((position'',
orientation''))
Assign (position''', orientation''') to virtual camera
```

In an example embodiment, the mixed reality device 2 can supplement data provided by the tracking system by incorporating its internal sensor data. In this example embodiment, on-device sensors such as accelerometers, gyroscopes, and magnetometers, are used to provide information regarding the pitch, yaw, and roll of the device 2. This data may then be transmitted to the tracking server 210 so that the spatial location and/or spatial position (generally, spatial data) of the one or more instances of the mixed reality devices 2 can be accurately tracked. The tracking client 250 may be configured to package the data collected from the supplemental tracking system with the data from the internal sensors of the device 2 before transmitting the data to the tracking server 210. Packaging the data may include, and is not limited to, combining the supplemental and internal sensor data, transforming the combined data set, or preparing the data for transfer to the tracking server 210. Alternately, the supplemental tracking data and internal sensor data can be used by the mixed reality device 2 directly in some embodiments. It was determined that the tracking accuracy of the combined system was improved, on average, by two to three degrees when compared to the external tracking hardware alone. Once the data has been packaged by the tracking client 250 the data is then transmitted to the tracking server 210 so that the spatial location data and/or spatial orientation data of the one or more devices 2 can be accurately tracked. Alternately, in some embodiments, the supplemental tracking data and internal sensor data can be used by the device 2 directly.

A skilled person would understand that alternate ways of obtaining accurate tracking data may be used without departing from the scope of this disclosure. For example, machine vision solutions or image processing techniques may also be used to accurately track the one or more mixed reality devices 2 or to improve tracking.

In another aspect, the mixed reality device 2 automatically calibrates itself in the tracked space to maintain the accuracy of the location data. In an example embodiment, key points are identified in the real space that correspond to points in the virtual space. Referring to FIG. 7 as an example, one or more real world posts 701 may be used as key points for calibration. These key points are also modeled and mapped in the virtual space. The calibration system can then compare the real world key points to the virtual key points to determine if the system is calibrated. For the case where the real and virtual key points match, then the system is calibrated.

Experience Client

In another aspect, the mixed reality device 2 comprises an experience client 260. The experience client 260 is generally configured to provide the mixed reality to the end user 1 through the display of the mixed reality device 2.

In addition to providing the mixed reality to the end user 1, the experience client (in some example embodiments) may also: (A) align the virtual world cameras 402 and real world cameras 401; (B) match lighting conditions between the virtual world and the real world as displayed on the mixed reality device 2; and (C) determine occlusion effects between real and virtual world objects.

In some embodiments, the experience client 260 may also be referred to as a mixed reality renderer (not shown). In some example embodiments, some or all of the functions of the experience client 260 or renderer may be decoupled from the mixed reality device 2. For example, in some implementations, the renderer may match lighting conditions, determine occlusion effects, and render the mixed reality experience on a central server, then stream the resulting experience to the mixed reality devices 2. In this example embodiment, the mixed reality devices would effectively be "thin clients" having the minimal set of inputs (e.g., camera) and outputs (e.g., a display) for providing location information, camera view information, and displaying the mixed reality event. A skilled technician would understand that other architectures may be used without departing from the scope of this disclosure. For example, in some example embodiments, occlusion may be determined on a server whereas lighting matching may be determined at the mixed reality device. A skilled technician would understand that factors such as network bandwidth availability and available computing power at both the server and the mixed reality device 2 may influence how example embodiment systems are implemented.

In some example embodiments, the experience client 260 comprises a multiplayer gaming engine that is capable of rendering a virtual scene, mapping the location of players in the virtual world, and triggering interactive events with the virtual world. In an example embodiment, a UNITY game engine client is provided on each of the mixed reality devices 2. In this example embodiment, the UNITY game engine is customized to provide mapping of the mixed reality clients 240 in a virtual space, aligning a real world camera 401 and a virtual world camera 402, matching lighting, and determining occlusion.

Interactivity

In some example embodiments, the experience client 260 may be configured to allow for interaction with events, characters, and objects from the virtual world. In an example embodiment, a UNITY game engine is configured to respond to stimuli such as, for example, the spatial location data and/or spatial orientation data of the one or more mixed reality devices 2 or input from users 1 through the mixed reality device 2. For example (in one example embodiment), a virtual world character may be configured to direct its presentation to the mixed reality device 2 that is mapped closest to the virtual character. In another example embodiment, during the presentation of the virtual character, the virtual character may prompt for an input from the one or more users 1 through input devices (associated with respective instances of the device 2) provided on the mixed reality devices 2. Using the example provided above, the virtual character may ask the closest user 1 (via their device 2) a question, and wait for a response from the user 1. In this example embodiment, the mixed reality device 2 may be configured to accept a response input, for example, through the microphone, touchscreen, or other input device of the device 2. The virtual character may then respond accordingly to the provided input that was provided by the user 1 (in accordance with the programming of the virtual character).

Camera Alignment

In an example embodiment, the UNITY engine running on the experience client 260 is the client version of the UNITY engine running on the experience server 220. The UNITY engine is used to model and represent the virtual world. In this example embodiment, the UNITY engine uses a virtual world camera 402 to render the virtual space based on the point of view (POV) of the virtual world cameras 402.

The experience client 260 then mixes this virtual view (as seen from the perspective of the virtual world camera 402) and a corresponding real world view (as seen from the perspective of the real world camera 401), thereby providing a mixed reality view (from the POV of the device 2). In order to properly mix these views, however, the point of view of the virtual world camera 402 and the point of view of the real world camera 401 must be aligned.

FIGS. 4A to 4C depict examples of a representative drawing of example embodiments of the virtual camera and the real camera in various states of alignment (relative to each other).

Misalignment of the cameras (between the virtual world camera and the real world camera) may problematic for rendering mixed reality content. For instance, it was determined that a one degree of misalignment the between real view (real POV of the real camera) and the virtual view POV of the virtual camera, as shown in FIG. 4A, results in an uncomfortable user experience. Misalignment of the two views (the real POV and the virtual POV) may result in virtual world renderings that appear strange (to the user) in the real world (as displayed on the device 2). These renderings can include strange renderings such as floating characters, misplaced objects, and characters appearing to walk through walls, etc.

For instance, FIG. 4A and FIG. 4B shows how even a slight misalignment of the physical and virtual camera can cause problems in viewer perception. FIG. 4C is an example of where the virtual camera (virtual world camera) and the physical camera (real world camera) are in alignment This misalignment is generally caused by insufficiently accurate tracking data or lag times.

In an embodiment, the system is configured to display mixed reality content on a device 2 in such a way that the mixed reality content, which is displayed to the user, shows the virtual world content as if the virtual world content is captured by a real world camera of the device 2. The spatial location data and/or spatial orientation data of the devices 2 may be tracked by using a tracking system (that is either hardware based and/or software based). This arrangement reduces the misalignment of the point of view (POV) of the virtual world camera and the point of view (POV) of the real world camera. Thus, the content rendered from the point of view (POV) of the virtual camera and displayed on the device 2 appears as if the content was captured by the real world camera of the device 2 (for a particular user using the device 2). Therefore, each user, which views their own instance of the device 2, may view (see or perceive) the virtual world content and the real world content (as provided or as displayed by the display of their instance of the device 2) from the point of view of their device 2 (from the point of view of the real world camera of the device 2). The system is configured to track a plurality of the devices 2 at any given time. This arrangement allows each of the users to simultaneously share the same virtual reality content, but from the point of view (POV) of the device 2 being used by a selected or particular user of the device 2.

It will be appreciated that the point of view (POV) of a real world camera is not necessarily the same as the field of view (FOV) of a real world camera. For instance, the real world camera deployed on two instances of the device 2 may have different FOVs; for instance, the FOV for one instance of the real world camera may be 27 degrees, and the FOV for another instance of the real world camera may be 25 degrees. For the case where the two real world cameras have the same orientation and same position (this is not a highly likely scenario or condition), then these real world cameras would have the same POV (and the real world cameras would not necessarily have the same FOV). It will be appreciated that field of view (FOV) has a different meaning than point of view (POV).

In an example embodiment, device location data is used to determine the POV of the real world camera 401 of the mixed reality device 2. This information is then used to position the virtual world camera 402 in the the UNITY engine so that the POV of the virtual world camera 402 aligns with the POV of the real world camera 401 of the mixed reality device 2.

Generally, the field of view (FOV) describes the angular extent of a given scene that is currently viewable by the real world camera 401. In this example embodiment, the FOV for the real world camera 401 of the device 2 was calculated (since the information was not provided by the manufacturer). In other example embodiments, the FOV for the real world camera 401 (physical camera) may not need to be calculated. In the example embodiment where the device is an APPLE IPAD (TRADEMARK) device with a retina display, the FOV was calculated for the camera in video mode.

In one example embodiment, calculating or determining the FOV for the real world camera 401 requires that the focal length of the real world camera 401 and the aspect ratio of the screen are known. The FOV can then be determined using the following equation:

$$V = 2 * \arctan\left(\frac{S}{2 * F}\right)$$

where, [F] is the focal length calculated from camera calibration, and [S] is the aspect ratio of the screen. In this example embodiment, the aspect ratio of an APPLEIPAD (TRADEMARK) device with a retina display is 1.33 (4:3).

In some example embodiments, the focal length of the real world camera 401 may be known. For instance, in some example embodiments, the focal length of the real world camera 401 may be identified in the specification sheets provided by the manufacturer. If not provided by the manufacturer, then the focal length is to be determined.

In this example embodiment, however, the focal length of the real world camera 401 of the mixed reality device 2 was unknown, and was (therefore) calculated. In this example embodiment, the MATLAB (TRADEMARK) Camera Calibration Toolbox was used to assist in determining (calculating) the focal length of the real world camera 401 of the device 2. The toolbox takes multiple images of a checker board pattern as input and calculates the optimum intrinsic parameters for the APPLE IPAD (TRADEMARK) camera through a four step camera calibration procedure. The intrinsic parameters are: (A) Focal Length; (B) Principal Point; (C) Skew Coefficients; and (D) Distortions. For Focal Length, the returned parameters represent both horizontal and vertical focal lengths. Ideally the numerical difference between them may be very small. However, the primary interest is in the vertical focal length: for Principal Point, the principal point coordinates where the camera is focusing; for Skew Coefficients, the angle between horizontal and vertical pixels; for Distortions, the image distortion coefficients. For instance, it was determined that the FOV for an APPLE IPAD (TRADEMARK) device with a retina display was 0.4812 Radians, or 27.57 Degrees.

Once the POV of the real world camera 401 is determined, the POV of the virtual world camera 402 is aligned with the POV of the real world camera 401. In this example embodiment, the virtual world camera 402 may be aligned with the real world camera 401 based on the spatial location, spatial direction, and/or POV of the real world camera 401. With the POV of the real world camera and the POV of the virtual camera spatially aligned with each other, the mixed reality device 2 is able display a combination of the real world view and the corresponding virtual world view, on the display of the device 2, to the user from the POV of the device 2.

Lighting Matching

In another aspect, the experience client 260 is configured to adjust the lighting of the mixed reality displayed through the mixed reality device 2. Generally, the illumination condition in the real world does not match the lighting intensities of animations. If the captured real images are used as the background without any processing, the overlayed animations may contrast sharply with the background, detracting from the mixed reality experience. Matching lighting and tone conditions between the POV of the virtual world camera 402 and the POV of the real world camera 401 may be important for a mixed reality system because it heightens the sense of realism and coherency (for the user via the display 2) when integrating virtual content with the real world content. Lighting may be matched by taking lighting samples from the real world, from the virtual world, or from a combination of both.

In some example embodiments, the lighting of the space is used to adjust the lighting of the mixed reality. In this example embodiment, measurements of the ambient lighting conditions of the space are obtained via the real world camera 401 in the mixed reality device 2. In this example embodiment, luminosity profiles extracted from camera feed can be used to guide the dynamic adjustment of ambient lighting components of the mixed reality. The lighting profile of the rendered virtual content is then matched to the lighting conditions of the feed of the real world camera 401.

In other example embodiments, the lighting conditions of the mixed reality content and/or the virtual content can be used to adjust the lighting of the real world as viewed through the mixed reality device 2 (viewed from the POV of the device 2). In this example embodiment, the lighting conditions are set in the mixed reality sequence. That is, the desired lighting conditions for the mixed reality are known. This lighting information can then be used to modify the real world lighting conditions as displayed through the mixed reality device 2. In this example embodiment, the virtual scene is sampled through the virtual world camera 402 for various poses and locations, and statistical properties from the rasterized rendering are extracted. These properties are used to guide contrast and tone enhancement via intensity transformation on the live camera feed in order to match the lighting conditions of the real view to the lighting conditions of the virtual view (virtual content).

In yet another example embodiment, the lighting conditions displayed to the user through the mixed reality device 2 may be adjusted based on lighting information obtained from both the virtual world and the real world. In this example embodiment, a hybrid of the two techniques, as described above, can be used to modify the lighting conditions displayed through the experience client device.

In this example embodiment, the lighting engine includes a two-way channel for estimating and matching lighting properties in the mixed reality scene. This can be performed either by extracting lighting information from the animated content itself or from the video feed on the real world camera 401 in order to dynamically match either the tone of the camera feed or the ambient lighting of the animated content respectively.

In some example embodiments, a contrast stretching method is used to process the real world view (real world content 3) in real time in order to adjust lighting properties. In this example embodiment, the contrast of the image (the real world content) is changed by stretching/shrinking the range of intensity values it contains to match the desired range of values in the animations in the virtual world content 4.

The intensity range of virtual animations (the virtual world content 4) over which the image pixel values may be extended is determined. Multiple light sources are integrated in the virtual scene (the virtual world content 4), including point light, directional light, and ambient light. The mixed reality renderer then examines the virtual objects (the virtual world content 4) under the synthetical (synthetic or virtual) lighting circumstance, and determines (finds) the upper bound value $V_{max}^c$ and the lower bound value $V_{min}^c$ for each channel [c] (c∈{red, green, blue}).

When capturing the real world scene (the real world content 3), the intensity limits of the original image are determined, including the upper bound $R_{max}^c$ and the lower bound $R_{min}^c$ for the channel [c] (where [c]∈{red, green, blue}).

If $R_{max}^c - R_{min}^c < V_{max}^c - V_{min}^c$, the intensity values in real images will be stretched to fit the virtual objects, while the real intensity range will be compressed if $R_{max}^c - R_{min}^c > V_{max}^c - V_{min}^c$.

For each pixel $P_{in}^c$ in the original image will be mapped to output value $P_{out}^c$ using the out function:

$$P_{out}^c = (P_{in}^c - R_{min}^c)\left(\frac{V_{max}^c - V_{min}^c}{R_{max}^c - R_{min}^c}\right) + V_{min}^c$$

where [c]∈{red, green, blue}.

The above equation is a linear intensity mapping function.

Referring now to FIGS. 4A to 4C, in one aspect there is provided a method for displaying the virtual world content 4 on the device 2. The method includes determining, using the tracking assembly 130, a spatial location data and/or an orientation data of a real world camera 401 of the device 2.

Once the spatial data (the spatial location data and/or the orientation data) of the real world camera 401 of the device 2 has been determined, the virtual world camera 402 (associated with or in a virtual world) is aligned (spatially tracked) with the real world camera 401 by using the spatial location data and/or spatial orientation data of the real world camera 401 (which is expected to change over time). The virtual world camera 402 and the real world camera 401 are aligned with each other so that the point of view (POV) of the virtual world camera 402 is aligned with the point of view (POV) of the real world camera 401 of the device 2. The virtual world camera 402 is configured to provide a point of view (POV) of the virtual world from the point of view of the spatial position and/or orientation data of the real world camera 401. The spatial position data and/or spatial orientation data of the real world camera 401 is: (A) mapped to the virtual world, and (B) tracked by a tracking mechanism so that the spatial location data and/or spatial orientation data of the virtual world camera 402 may match up with that of the real world camera 401.

Once the virtual world camera 402 and the real world camera 401 are spatially aligned (with each other), the virtual world content 4 is rendered by the experience system 280 (depicted in FIG. 2AA) from the point of view (POV) of the virtual world camera 402, and then displayed on the display of the device 2. The real world content 3 is also captured through the real world camera 401. The virtual world content 4 that is rendered and the real world content 3 that is captured are displayed by the display device of the device 2 (to the user) in such a way that the virtual world content 4 appears to be captured by (viewed from) the real world camera 401. It may be noted that the virtual world may include, at least in part, a virtual representation of at least part of the real world (such as a set of stairs, etc.).

Figure 5A:
FIGS. 5A and 5B depict examples of images showing the effects of lighting adjustments.
Figure 5B:

FIGS. 5A and 5B depict examples of images showing the effects of lighting adjustment.

FIGS. 5A and 5B illustrate the result of contrast stretching. The result without contrast stretching is displayed in FIG. 5A, in which the real world background (real world content 3) is brighter when compared to the virtual character (virtual world content 4), in this case a virtual character.

FIG. 5B shows the mixed scene with contrast stretching, where the intensity range in the real world (real world content 3) is compressed to match the virtual scene (virtual world content 4), and thus the virtual character is conspicuous in the dark circumstance.

In other example embodiments, alternative methods for adjusting lighting can be used to achieve the same effect as contrast stretching. For example, a skilled technician would understand that histogram analysis may be also be used to perform lighting matching. The method used may depend on the computing power available to the mixed reality device 2 or the renderer; the renderer is configured to render images to the display device of the device 2. The method used may depend on the computing power available to the experience system 280.

Occlusion

Figure 6A:
FIG. 6A depicts an example image of virtual barrels being occluded by real world stairs.

FIG. 6A depicts an example image of virtual barrels being occluded by real world stairs.

Figure 6B:
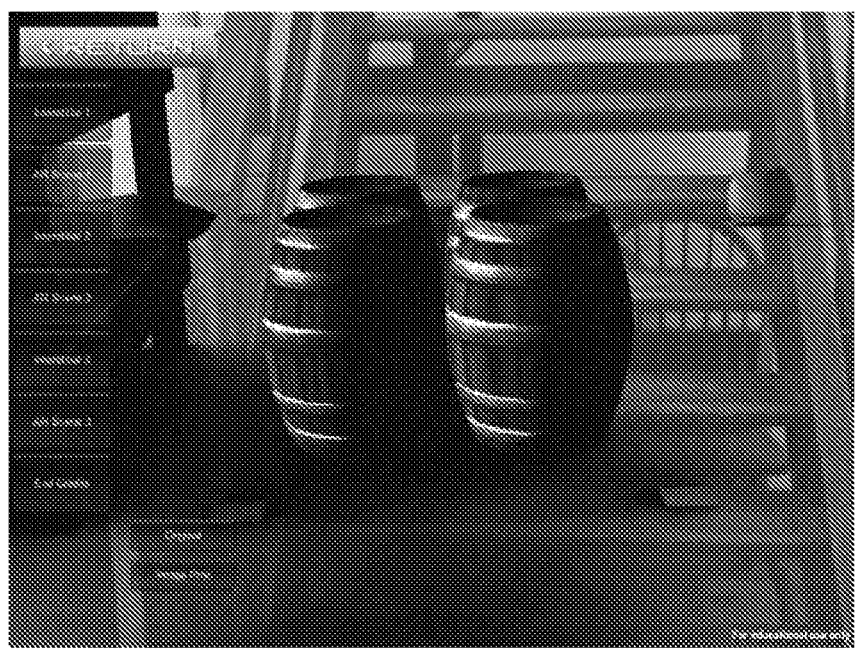
FIG. 6B depicts an example image of virtual barrels not being occluded by real world stairs.

FIG. 6B depicts an example image of virtual barrels not being occluded by real world stairs.

In another aspect, the experience client 260 can determine occlusion for virtual and real objects in the space. That is, when displaying the mixed reality through a mixed reality device 2, the virtual objects can occlude real objects (and vice versa). For instance, in the case of virtual barrels stored underneath a real-world plank staircase as shown in FIG. 6A, when looking directly at the plank staircase the stairs may appear to occlude the virtual barrels. When the user moves to a position where the stairs would not logically occlude the virtual barrels, then the barrels are rendered without the occlusion. FIG. 6B is the same view as FIG. 6A but without the real world plank staircase occluding the virtual barrels.

In some example embodiments, the experience client 260 determines the locations of the mixed reality device 2, the virtual objects, and the real objects. Using this data, the experience client renders the virtual object so that it appears, through the mixed reality device 2, that the real object occludes the virtual object.

In this example embodiment, the experience client 260, through the tracking system described above, knows the location of the mixed reality device 2 in the space. The experience client 260 also knows the location of the real and virtual objects in the space since they are mapped in the experience client 260. In this example embodiment, the virtual objects and the real objects, as well as the dimensions and characteristics of the space, are mapped in the UNITY engine.

The experience client 260, with the information provided above, can then render the virtual object so that it appears to be occluded by the real object when a user is in a location where logically the virtual object, if it were real, may be occluded by the real object. In this example embodiment, the real world object is rendered in the virtual world (i.e., in the UNITY engine). In this example embodiment, the virtual world representation of the real world object is texture mapped using data from the real world view. This virtual world representation of the staircase can then interact with virtual world objects, such as the virtual barrels, so that the objects can occlude each other when they are displayed through the mixed reality device 2.

In another example embodiment, the real world object may be modeled in the virtual world as an untextured polygon such that the untextured polygon, when displayed through the mixed reality device 2, overlays the real-world object. In this example embodiment, the untextured polygon overlay is transparent or partially transparent so that the real-world object can be seen through the overlay. In this example embodiment, real world objects that would naturally occlude other objects are selected for rendering in the virtual world. Examples of such objects include, but are not limited to, structural posts, doorways, furniture, stairs, and other users.

A skilled technician would understand that other methods of rendering occlusion through a mixed reality device may be used without departing from the scope of this disclosure. For example, the experience client may determine the dimensions and location of the real-world items on the fly and use that information to generate occlusion effects.

Local Audio Module

In another aspect, the experience client 260 comprises a local audio module 270 for providing a localized audio experience to the user 1 of the mixed reality device 2. In an example embodiment, the mixed reality event may have audio associated with it. The audio, for the purposes of realism, may originate from the location of the mixed reality event. For example, dialog may seem to be coming from a mixed reality character's location and not the other end of the space. In an example embodiment, the gaming engine used by the experience client 260 can also handle localized audio. Thus, the mixed reality event may have associated audio properties. This audio playback may then be adjusted based on the spatial location (spatial data) of the mixed reality device 2 in the room (in the real world). For example, if a mixed reality event occurs at the far end of the space relative to the location of the mixed reality device 2, then the audio may be adjusted so that it sounds like the event is occurring at the far end of the space. In this example embodiment, the UNITY gaming client is capable of adjusting audio properties based on the location of the mixed reality device. This can include lowering or panning audio levels based on the distance of the mixed reality device 2 from the event, or adjusting audio levels in response to global audio settings.

It will be appreciated that the audio may be synchronous or asynchronous with mixed reality events. An example of synchronous audio is dialogue that is spoken by a mixed reality character (either a virtual character or a real person), and/or the sound effect of a door closing where a mixed reality door is closed. Examples of asynchronous sound include the ambient sound of a location, voice over narration, and scored music; these sounds are not synchronized with the visual presentation of a specific mixed reality event.

Additional Description

The following clauses are offered as further description of the examples of the apparatus. Any one or more of the following clauses may be combinable with any another one or more of the following clauses and/or with any subsection or a portion or portions of any other clause and/or combination and permutation of clauses. Any one of the following clauses may stand on its own merit without having to be combined with any other clause or with any portion of any other clause, etc.

Clause (1): a method (either taken alone, or with a method of any clause mentioned in this paragraph, or any portion of any clause mentioned in this paragraph), including: a method for sharing a mixed reality between one or more computing devices, comprising: determining a location and an orientation (the spatial location data and/or spatial orientation data) of a real world camera of one or more computing devices; mapping the spatial location data and/or spatial orientation data of each of the one or more computing devices into a mixed reality manager; and presenting an event that is shared among the one or more computing devices, and, the presenting of the event is experienced simultaneously and varies among each of the one or more computing devices depending on the location or the orientation or both. Clause (2): a method (either taken alone, or with a method of any clause mentioned in this paragraph, or any portion of any clause mentioned in this paragraph), wherein the step of presenting further comprises: registering the camera input with the event for aligning a real world view from the camera input with a virtual world view of the event. Clause (3): a method (either taken alone, or with a method of any clause mentioned in this paragraph, or any portion of any clause mentioned in this paragraph), wherein the step of presenting further comprises: determining occlusion between one or more real objects in the real world view from the camera and one or more virtual objects in the virtual world view of the event. Clause (4): a method (either taken alone, or with a method of any clause mentioned in this paragraph, or any portion of any clause mentioned in this paragraph), wherein the step of presenting further comprises: matching lighting between the real world view from the camera input and the virtual world view from the event. Clause (5): a method (either taken alone, or with a method of any clause mentioned in this paragraph, or any portion of any clause mentioned in this paragraph), wherein: the event is an interactive performance (also called an interactive cinematic performance). Clause (6): a method (either taken alone, or with a method of any clause mentioned in this paragraph, or any portion of any clause mentioned in this paragraph), wherein: the one or more computing devices comprise one or more input devices for interacting with the event. Clause (7): an apparatus (either taken alone, or with an apparatus of any clause mentioned in this paragraph, or any portion of any clause mentioned in this paragraph), including: a system for sharing a mixed reality between one or more computing devices, each of the one or more computing devices providing an output, a camera input, the spatial location data and/or spatial orientation data of the camera input, the system comprising: a mixed reality manager for coordinating an event among the one or more computing devices based on the spatial location (spatial data) and the view point (point of view or POV) for each of the one or more computing devices; and a mixed reality renderer for rendering the event simultaneously on the output of the one or more computing devices, and the rendering of the event varies among each of the one or more computing devices depending on the location or the view point or both. Clause (8): an apparatus (either taken alone, or with an apparatus of any clause mentioned in this paragraph, or any portion of any clause mentioned in this paragraph), wherein the mixed reality renderer is further configured to: register the camera input with the event for aligning a real world view from the camera input with a virtual world view of the event. Clause (9): an apparatus (either taken alone, or with an apparatus of any clause mentioned in this paragraph, or any portion of any clause mentioned in this paragraph), wherein the mixed reality renderer is further configured to: determine occlusion between one or more objects in the real world view and one or more objects in the virtual world view. Clause (10): an apparatus (either taken alone, or with an apparatus of any clause mentioned in this paragraph, or any portion of any clause mentioned in this paragraph), wherein the mixed reality renderer is further configured to: match lighting between the real world view from the camera input and the virtual world view from the event. Clause (11): an apparatus (either taken alone, or with an apparatus of any clause mentioned in this paragraph, or any portion of any clause mentioned in this paragraph), wherein the event is an interactive performance (also may be called a cinematic performance. Clause (12): an apparatus (either taken alone, or with an apparatus of any clause mentioned in this paragraph, or any portion of any clause mentioned in this paragraph), wherein: the one or more computing devices comprise one or more input devices for interacting with the event. Clause (13): an apparatus (either taken alone, or with an apparatus of any clause mentioned in this paragraph, or any portion of any clause mentioned in this paragraph), including: a system for sharing a mixed reality event between mixed reality devices, each of the mixed reality devices having a real world camera, the system comprising: a mixed reality manager being configured to coordinate display of a mixed reality event having a virtual world content and a real world content among the mixed reality devices based on a point of view for each of the mixed reality devices; and a mixed reality renderer being configured to render the mixed reality event amongst the mixed reality devices, in which rendition of the mixed reality event is experienced simultaneously via the mixed reality devices, and the point of view of the mixed-reality event that is rendered on a selected mixed reality device varies from the point of view of the mixed-reality event that is rendered on another selected mixed reality device depending on the spatial data of the selected mixed reality device. Clause (14): a method (either taken alone, or with a method of any clause mentioned in this paragraph, or any portion of any clause mentioned in this paragraph), including: a method for sharing a mixed reality between mixed reality devices, comprising: determining the spatial location data and/or spatial orientation data (spatial data) of the mixed reality devices; mapping the spatial location data and/or spatial orientation data of each of the mixed reality devices into a mixed reality manager; and presenting a mixed-reality event having virtual world content and real word content that is shared among the mixed reality devices, in which presentation of the mixed-reality event is experienced simultaneously via the mixed reality devices, and the point of view of the mixed-reality event that is experienced on a selected mixed reality device varies from the point of view of the mixed-reality event that is experienced by another selected mixed reality device depending on the spatial data of the selected mixed reality device. Clause (15): a method (either taken alone, or with a method of any clause mentioned in this paragraph, or any portion of any clause mentioned in this paragraph), wherein the spatial data of the selected mixed reality device includes any one of: (A) spatial location, (B) spatial orientation, and (C) spatial location and spatial orientation. Clause (16-A): a method (either taken alone, or with a method of any clause mentioned in this paragraph, or any portion of any clause mentioned in this paragraph), including: performing an audio content associated with the virtual world content. Clause (16-B): a method (either taken alone, or with a method of any clause mentioned in this paragraph, or any portion of any clause mentioned in this paragraph), including: performing an audio content. Clause (16-C): a method (either taken alone, or with a method of any clause mentioned in this paragraph, or any portion of any clause mentioned in this paragraph), including: determining spatial data of a device having a real world camera; and aligning a virtual world camera in a virtual world with the real world camera using the spatial data of the device so that a point of view of the virtual world camera in the virtual world is aligned with a point of view of the real world camera. Clause (16-D): an apparatus (either taken alone, or with an apparatus of any clause mentioned in this paragraph, or any portion of any clause mentioned in this paragraph), wherein: a device 2 is configured to perform an audio content associated with the virtual world content. Clause (16-E): an apparatus (either taken alone, or with an apparatus of any clause mentioned in this paragraph, or any portion of any clause mentioned in this paragraph), wherein: a device 2 is configured to perform an audio content. Clause (16-F): an apparatus (either taken alone, or with an apparatus of any clause mentioned in this paragraph, or any portion of any clause mentioned in this paragraph), further comprising: a tracking assembly configured to determine spatial data of a device having a real world camera; and an experience system configured to aligning a virtual world camera in a virtual world with the real world camera using the spatial data of the device so that a point of view of the virtual world camera in the virtual world is aligned with a point of view of the real world camera.

Clause (1A): a method (either taken alone, or with a method of any clause mentioned in this paragraph, or any portion of any clause mentioned in this paragraph), including: a method for displaying a virtual world content 4 on a device 2, comprising: determining, using a tracking assembly 130, the spatial location data and/or spatial orientation data of a real world camera 401 of the device 2; aligning a virtual world camera 402 in a virtual world with the real world camera 401 using the spatial location data and/or spatial orientation data of the real world camera 401 so that a point of view POV of the virtual world camera 402 in the virtual world is aligned with a point of view POV of the real world camera 401 in the real world; rendering a virtual world content 4 from the POV of the virtual world camera 402 using an experience system; capturing a real world content 3 through the real world camera 401; and displaying the real world content 3 and the virtual world content 4 on the device 2 so that: A the virtual world content 4 appears to be captured by the real world camera 401 in the real world, and B the virtual world comprises, at least in part, a virtual representation of the real world. Clause (2A): a method (either taken alone, or with a method of any clause mentioned in this paragraph, or any portion of any clause mentioned in this paragraph), including: determining an artificial occlusion of the virtual world content 4 so that the virtual world content occludes, or is occluded by, the real world content 3. Clause (3A): a method (either taken alone, or with a method of any clause mentioned in this paragraph, or any portion of any clause mentioned in this paragraph), including: matching a lighting of the virtual world content 4 to a lighting of the real world content 3. Clause (4A): a method (either taken alone, or with a method of any clause mentioned in this paragraph, or any portion of any clause mentioned in this paragraph), including: interacting with the virtual world content 4 displayed on the device 2 by obtaining input from an input assembly of the device 2. Clause (5A): a method (either taken alone, or with a method of any clause mentioned in this paragraph, or any portion of any clause mentioned in this paragraph), including: displaying additional virtual world content 4 when a trigger condition is met. Clause (6A): a method (either taken alone, or with a method of any clause mentioned in this paragraph, or any portion of any clause mentioned in this paragraph), including: performing an audio content on the device 2, the audio content associated with the virtual world content 4. Clause (7A): a method (either taken alone, or with a method of any clause mentioned in this paragraph, or any portion of any clause mentioned in this paragraph), including: performing an audio content. Clause (8A): a method (either taken alone, or with a method of any clause mentioned in this paragraph, or any portion of any clause mentioned in this paragraph), wherein the virtual reality content 4 is displayed simultaneously on a plurality of devices 2, the virtual reality content 4 being displayed from the POV of the real world camera 401 of each of the plurality of devices 2. Clause (9A): an apparatus (either taken alone, or with an apparatus of any clause mentioned in this paragraph, or any portion of any clause mentioned in this paragraph), including: a system for displaying a virtual reality content 4, comprising: a device 2 having a display and a real world camera 401; a tracking assembly 130 for determining the spatial location data and/or spatial orientation data the real world camera 401; and an experience system configured to: align a virtual world camera 402 in a virtual world with the real world camera 401 of the device 2 using data from the tracking assembly 130 so that a POV of the virtual world camera 402 in the virtual world is aligned with a POV of the real world camera 401 in a real world; and render a virtual world content 4 from the POV of the virtual world camera 402; the rendered virtual world content 4 and a real world content 3 captured by the real world camera 401 being displayed on the display of the device 2 so that the virtual world content 4 appears to be captured by the real world camera 401 in the real world; wherein the virtual world (to be displayed via the device 2) comprises, at least in part, a virtual representation of the real world. Clause (10A): an apparatus (either taken alone, or with an apparatus of any clause mentioned in this paragraph, or any portion of any clause mentioned in this paragraph), wherein the experience system is further configured to determine an artificial occlusion of the virtual world content 4 so that the virtual world content 4 occludes, or is occluded by, the real world content 3. Clause (11A): an apparatus (either taken alone, or with an apparatus of any clause mentioned in this paragraph, or any portion of any clause mentioned in this paragraph), wherein the experience system is further configured to match a lighting of the virtual world content 4 to a lighting of the real world content 3. Clause (12A): an apparatus (either taken alone, or with an apparatus of any clause mentioned in this paragraph, or any portion of any clause mentioned in this paragraph), wherein the device 2 is further configured to accept an input from a user 1, the input used by the experience system to interact with the virtual world content 4. Clause (13A): an apparatus (either taken alone, or with an apparatus of any clause mentioned in this paragraph, or any portion of any clause mentioned in this paragraph), wherein the experience system is further configured to display additional virtual world content 4 when a trigger condition is met. Clause (14A): an apparatus (either taken alone, or with an apparatus of any clause mentioned in this paragraph, or any portion of any clause mentioned in this paragraph), wherein the device 2 is further configured to perform an audio content associated with the virtual world content 4. Clause (15A): an apparatus (either taken alone, or with an apparatus of any clause mentioned in this paragraph, or any portion of any clause mentioned in this paragraph), wherein the experience system is configured to operate on a computing device that is separate from the device 2 and wirelessly connected to the device 2. Clause (16A): an apparatus (either taken alone, or with an apparatus of any clause mentioned in this paragraph, or any portion of any clause mentioned in this paragraph), wherein the experience system is configured to perform an audio content. Clause (17A): an apparatus (either taken alone, or with an apparatus of any clause mentioned in this paragraph, or any portion of any clause mentioned in this paragraph), wherein the tracking assembly 130 is configured to wirelessly connect to the device 2. Clause (18A): an apparatus (either taken alone, or with an apparatus of any clause mentioned in this paragraph, or any portion of any clause mentioned in this paragraph), wherein the virtual world content 4 is displayed simultaneously on each of the plurality of devices 2, the virtual world content 4 is displayed from the POV of the real world camera 401 of each of the plurality of devices 2. Clause (19A): an apparatus (either taken alone, or with an apparatus of any clause mentioned in this paragraph, or any portion of any clause mentioned in this paragraph), wherein the virtual world content 4 includes a cinematic content. Clause (20A): an apparatus (either taken alone, or with an apparatus of any clause mentioned in this paragraph, or any portion of any clause mentioned in this paragraph), wherein the device 2 is a portable computing device.

It is obvious that the foregoing embodiments of the invention are examples and can be varied in many ways. Such present or future variations are not to be regarded as a departure from the scope of the invention, and all such modifications as may be obvious to one skilled in the art are intended to be included within the scope of the following claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It may be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, or components, that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for the purposes of this document, that the phrase "includes" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. A method for sharing a mixed reality between one or more computing devices, comprising:
    determining a location data and an orientation data of a camera input of the one or more computing devices;
    improving the accuracy of the location data and the orientation data by using a secondary tracking system;
    mapping the location and the orientation of each of the one or more computing devices into a mixed reality manager;
    setting a state of a state machine that is configured to trigger the presentation of an event on the one or more computing devices once a condition is met;
    changing the state of the state machine once the condition is met, thereby triggering the event on the one or more computing devices; and
    presenting the event on the one or more computing devices, wherein the event is experienced on the one or more computing devices depending on the location or the orientation or both.

2. The method of claim 1, wherein:
    the step of presenting further comprises:
        registering the camera input with the event for aligning a real world view from the camera input with a virtual world view of the event.

3. The method of claim 1, wherein:
    the step of presenting further comprises:
        determining occlusion between one or more real objects in a real world view from a camera providing the camera input and one or more virtual objects in a virtual world view of the event.

4. The method of claim 1, wherein:
    the step of presenting further comprises:
        matching lighting between a real world view from the camera input and a virtual world view from the event.

5. The method of claim 1, wherein:
    the event is an interactive performance.

6. The method of claim 1, wherein:
    the one or more computing devices comprise one or more input devices for interacting with the event.

7. The method of claim 1, further comprising:
    performing an audio content associated with the virtual world content.

8. The method of claim 1, further comprising:
    performing an audio content.

9. The method of claim 1, further comprising:
    determining spatial data of a device having a real world camera; and
    aligning a virtual world camera in a virtual world with the real world camera using the spatial data of the device so that a point of view of the virtual world camera in the virtual world is aligned with a point of view of the real world camera.

10. The method of claim 1, wherein the secondary tracking system comprises a radio frequency (RF) receiver array deployed in a space and a RF transmitter on each of the one or more computing devices for tracking the computing device in the space.

11. The method of claim 1, wherein the secondary tracking system is configured to use simultaneous location and mapping (SLAM) to track the computing device in the space.

12. The method of claim 11, wherein the secondary tracking system is further configured to predict a changing spatial location data and spatial orientation data.

13. A system for sharing a mixed reality between one or more computing devices, each of the one or more computing devices providing an output, a camera input, a location data, and an orientation data of the camera input, the system comprising:
    a non-transitory machine readable memory having machine executable instructions; and
    one or more processors that access the memory and execute the machine readable instructions, the machine readable instructions comprising:
        a mixed reality manager for coordinating an event among the one or more computing devices based on the location and a point of view for each of the one or more computing devices, the mixed reality manager having a state machine that is configured to trigger the presentation of an event on the one or more computing devices once a condition is met;
        a mixed reality renderer for rendering the event on the output of the one or more computing devices once the condition is met, and the rendering of the event varies among each of the one or more computing devices depending on the location or the point of view or both; and
    a secondary tracking system for improving the accuracy of the location data and the orientation provided by the computing devices.

14. The system of claim 13, wherein:
    the mixed reality renderer is further configured to:
        register the camera input with the event for aligning a real world view from the camera input with a virtual world view of the event.

15. The system of claim 13, wherein:
    the mixed reality renderer is further configured to:
        determine occlusion between one or more real world objects in a real world view and one or more virtual world objects in a virtual world view.

16. The system of claim 13, wherein:
    the mixed reality renderer is further configured to:
        match lighting between a real world view from the camera input and a virtual world view from the event.

17. The system of claim 13, wherein:
    the event is an interactive performance.

18. The system of claim 13, wherein:
    the one or more computing devices comprise one or more input devices for interacting with the event.

19. The system of claim 13, wherein:
    a device is configured to perform an audio content associated with the virtual world content.

20. The system of claim 13, wherein:
a device is configured to perform an audio content.

21. The system of claim 13, further comprising:
an experience system configured to aligning a virtual world camera in a virtual world with the real world camera using the spatial data of the device so that a point of view of the virtual world camera in the virtual world is aligned with a point of view of the real world camera.

22. The system of claim 13, wherein the secondary tracking system comprises a radio frequency (RF) receiver array deployed in a space and a RF transmitter on each of the one or more computing devices for tracking the computing device in the space.

23. The system of claim 14, wherein the secondary tracking system is configured to use simultaneous location and mapping (SLAM) to track the computing device in the space.

24. The system of claim 23, wherein the secondary tracking system is further configured to predict a changing spatial location data and spatial orientation data.

\* \* \* \* \*

UNITED STATES PATENT AND TRADEMARK OFFICE
CERTIFICATE OF CORRECTION

PATENT NO. : 9,940,897 B2
APPLICATION NO. : 14/893630
DATED : April 10, 2018
INVENTOR(S) : Ling Guan et al.

Page 1 of 1

It is certified that error appears in the above-identified patent and that said Letters Patent is hereby corrected as shown below:

On the Title Page

Item (73) Assignees:
Reads "REYERSON UNIVERSITY (CA)"
Should read --RYERSON UNIVERSITY (CA)--

Signed and Sealed this
Eighteenth Day of December, 2018

Andrei Iancu
*Director of the United States Patent and Trademark Office*